US012804131B2

(12) United States Patent
Park et al.

(10) Patent No.: US 12,804,131 B2
(45) **Date of Patent: *Nov. 17, 2026**

(54) IMAGE ENCODING/DECODING METHOD AND DEVICE FOR PERFORMING PREDICTION ON BASIS OF HMVP CANDIDATE, AND METHOD FOR TRANSMITTING BITSTREAM

(71) Applicant: LG ELECTRONICS INC., Seoul (KR)

(72) Inventors: Nae Ri Park, Seoul (KR); Jung Hak Nam, Seoul (KR); Hyeong Moon Jang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 147 days.

This patent is subject to a terminal disclaimer.

(21) Appl. No.: 18/812,579

(22) Filed: Aug. 22, 2024

(65) Prior Publication Data

US 2025/0055976 A1 Feb. 13, 2025

Related U.S. Application Data

(63) Continuation of application No. 17/636,911, filed as application No. PCT/KR2020/011101 on Aug. 20, 2020, now Pat. No. 12,120,289.

(60) Provisional application No. 62/890,036, filed on Aug. 21, 2019.

(51) Int. Cl.
*H04N 19/105* (2014.01)
*H04N 19/137* (2014.01)
*H04N 19/14* (2014.01)
*H04N 19/176* (2014.01)

(52) U.S. Cl.
CPC ......... *H04N 19/105* (2014.11); *H04N 19/137* (2014.11); *H04N 19/14* (2014.11); *H04N 19/176* (2014.11)

(58) Field of Classification Search
None
See application file for complete search history.

(56) References Cited

U.S. PATENT DOCUMENTS

2020/0014948 A1* 1/2020 Lai ......................... H04N 19/46
2022/0103828 A1* 3/2022 Zhang .................... H04N 19/52

* cited by examiner

*Primary Examiner* — Chikaodili E Anyikire
(74) *Attorney, Agent, or Firm* — Bryan Cave Leighton Paisner LLP

(57) ABSTRACT

An image encoding/decoding method and apparatus are provided. An image decoding method according to the present disclosure is performed by an image decoding apparatus. The image decoding method comprises deriving a prediction mode of a current block, constructing a merge candidate list for the current block, based on the prediction mode of the current block being a triangle partition mode (TPM), deriving motion information of two partitions of the current block based on the merge candidate list and two merge indices of the current block signaled through a bitstream, generating a prediction block of the current block based on the motion information, storing motion information of the current block, and updating a history-based motion vector predictor (HMVP) buffer based on the motion information of the current block.

11 Claims, 12 Drawing Sheets

FIG. 15
| Merge Index | L0 MV | L1 MV |
|---|---|---|
| 0 | x | |
| 1 | | x |
| 2 | x | |
| 3 | | x |
| 4 | x | |
FIG. 16
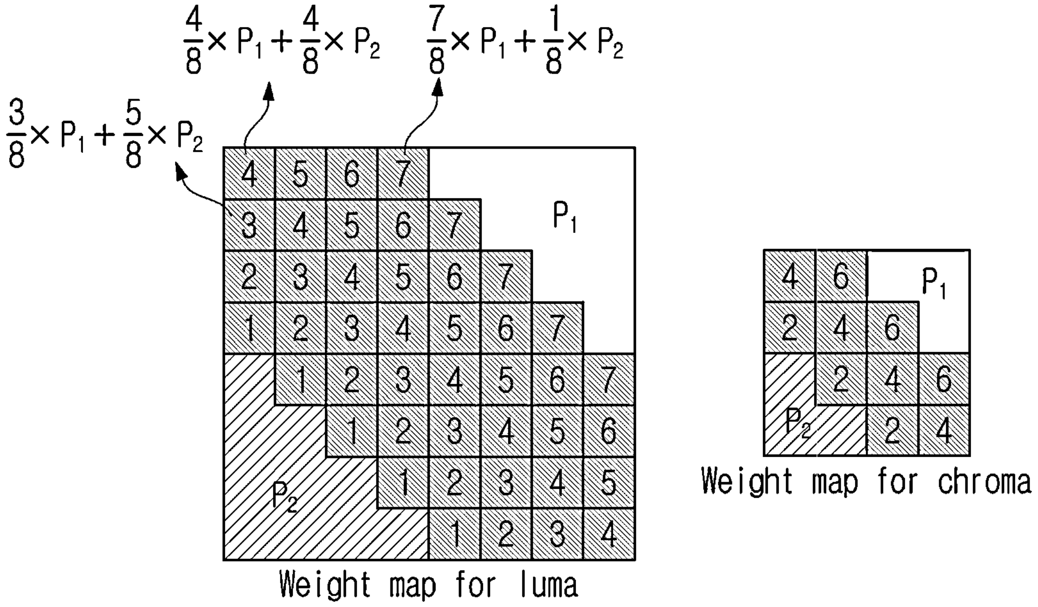
FIG. 17
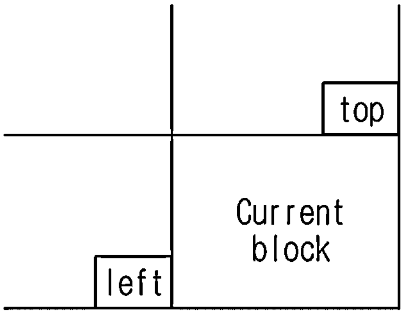

IMAGE ENCODING/DECODING METHOD AND DEVICE FOR PERFORMING PREDICTION ON BASIS OF HMVP CANDIDATE, AND METHOD FOR TRANSMITTING BITSTREAM

CROSS-REFERENCE TO RELATED APPLICATION

This application is a continuation of U.S. application Ser. No. 17/636,911, filed on Feb. 21, 2022, which is a National Phase entry pursuant to 35 U.S.C. § 371 of International Application No. PCT/KR2020/011101 filed on Aug. 20, 2020, and claims priority to and the benefit of U.S. Provisional Patent Application No. 62/890,036 filed on Aug. 19, 2019, the disclosures of which are incorporated herein by reference in their entirety.

TECHNICAL FIELD

The present disclosure relates to an image encoding/decoding method and apparatus and a method of transmitting a bitstream, and, more particularly, to an image encoding/decoding method and apparatus for performing inter prediction based on a history-based motion vector predictor (HMVP) candidate, and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus for performing inter prediction based on a history-based motion vector predictor (HMVP) candidate.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method according to an aspect of the present disclosure may comprise deriving a prediction mode of a current block, constructing a merge candidate list for the current block, based on the prediction mode of the current block being a triangle partition mode (TPM), deriving motion information of two partitions of the current block based on the merge candidate list and two merge indices of the current block signaled through a bitstream, generating a prediction block of the current block based on the motion information, storing motion information of the current block, and updating a history-based motion vector predictor (HMVP) buffer based on the motion information of the current block.

In the image decoding method according to the present disclosure, the merge candidate list may comprise an HMVP candidate.

In the image decoding method according to the present disclosure, the storing the motion information of the current block may comprise storing the motion information in units of 4×4 samples in the current block.

In the image decoding method according to the present disclosure, the updating the HMVP buffer may be performed based on motion information of a 4×4 sample unit at a predetermined position in the current block.

In the image decoding method according to the present disclosure, the predetermined position may be one of a center position, a top-left position or a bottom-right position in the current block.

In the image decoding method according to the present disclosure, the predetermined position may be derived regardless of a partition direction of the triangle partition mode.

In the image decoding method according to the present disclosure, the predetermined position may be differently derived according to a partition direction of the triangle partition mode.

In the image decoding method according to the present disclosure, based on a width and height of the current block being respectively cbWidth and cbHeight, the predetermined position may be derived as (cbWidth>>1, cbHeight>>1) based on the partition direction is diagonal partition and may be derived as (cbWidth>>1−1, cbHeight>>1) based on the partition direction is inverse diagonal partition.

In the image decoding method according to the present disclosure, motion information of the two partitions may comprise first motion information and second motion information, and the updating the HMVP buffer may be performed based on one of the first motion information or the second motion information In the image decoding method according to the present disclosure, one of the first motion information or the second motion information may be selected based on a partition direction of the triangle partition mode and the HMVP buffer may be updated based on the selected motion information.

In the image decoding method according to the present disclosure, the HMVP buffer may be updated based on one predefined motion information of the first motion information or the second motion information regardless of a partition direction of the triangle partition mode.

In the image decoding method according to the present disclosure, the motion information used to update the HMVP buffer may comprise a motion vector, a reference picture index, a prediction direction flag and a weight index of bcw set to 0.

An image decoding apparatus according to another aspect of the present disclosure may comprise a memory and at least one processor. The at least one processor may derive a prediction mode of a current block, construct a merge candidate list for the current block, based on the prediction mode of the current block being a triangle partition mode (TPM), derive motion information of two partitions of the current block based on the merge candidate list and two merge indices of the current block signaled through a bitstream, generate a prediction block of the current block based on the motion information, store motion information of the current block, and update a history-based motion vector predictor (HMVP) buffer based on the motion information of the current block.

An image encoding method according to another aspect of the present disclosure may comprise determining a prediction mode of a current block, constructing a merge candidate list for the current block, based on the prediction mode of the current block being a triangle partition mode (TPM), determining a merge candidate for two partitions of the current block based on the merge candidate list, deriving motion information of the two partitions of the current block based on the determined merge candidate, generating a prediction block of the current block based on the motion information, storing motion information of the current block, updating a history-based motion vector predictor (HMVP) buffer based on the motion information of the current block, and encoding a merge index specifying the determined merge candidate in a bitstream.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus for performing inter prediction based on a history-based motion vector predictor (HMVP) candidate.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 15 is a view illustrating a method of deriving unidirectional motion for each partition of a TPM.

FIG. 16 is a view illustrating a blending process of a TPM.

FIG. 17 is a view illustrating positions of neighboring blocks used to calculate a weight of CIIP.

MODE FOR INVENTION

Figure 1:
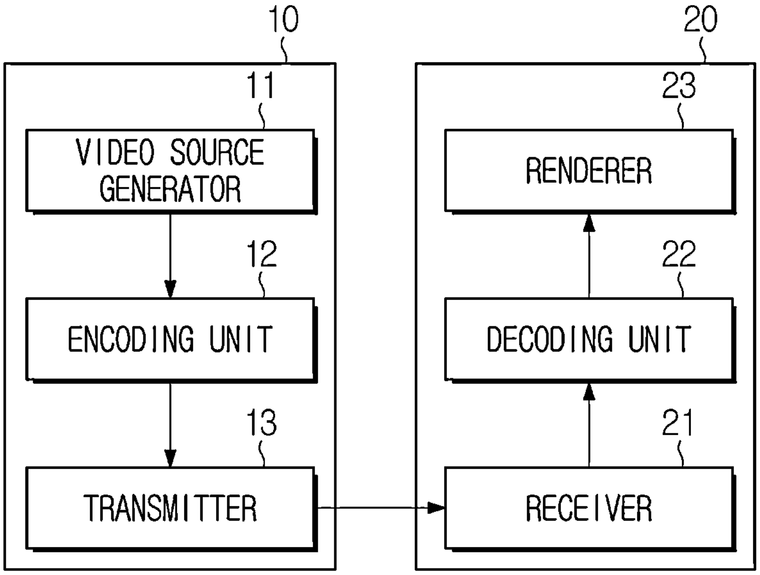
FIG. 1 is a view schematically illustrating a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
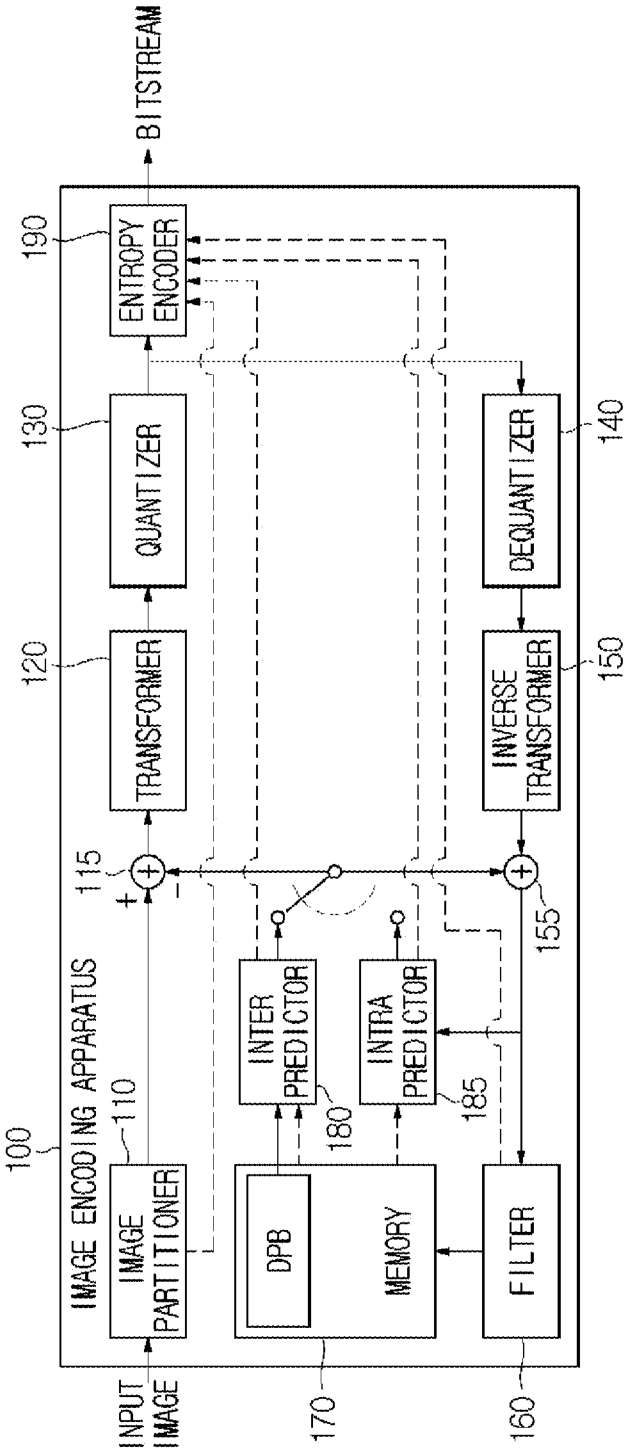
FIG. 2 is a view schematically illustrating an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi-prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loeve transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

Meanwhile, as described below, luma mapping with chroma scaling (LMCS) is applicable in a picture encoding process.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded)

and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
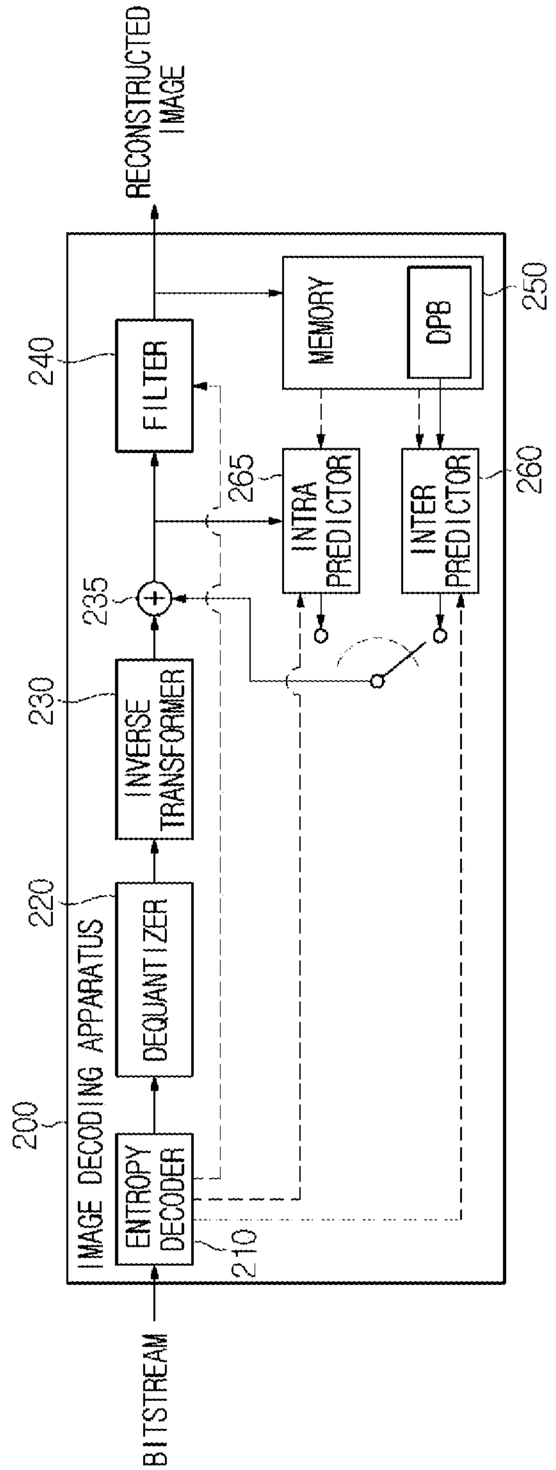
FIG. 3 is a view schematically illustrating an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi-prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). The description of the adder 155 is equally applicable to the adder 235.

Meanwhile, as described below, luma mapping with chroma scaling (LMCS) is applicable in a picture decoding process.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Overview of Inter Prediction

An image encoding apparatus/image decoding apparatus may perform inter prediction in units of blocks to derive a prediction sample. Inter prediction may mean prediction derived in a manner that is dependent on data elements of picture(s) other than a current picture. When inter prediction applies to the current block, a predicted block for the current block may be derived based on a reference block specified by a motion vector on a reference picture.

In this case, in order to reduce the amount of motion information transmitted in an inter prediction mode, motion information of the current block may be derived based on correlation of motion information between a neighboring block and the current block, and motion information may be derived in units of blocks, subblocks or samples. The motion information may include a motion vector and a reference picture index. The motion information may further include inter prediction type information. Here, the inter prediction type information may mean directional information of inter prediction. The inter prediction type information may indicate that a current block is predicted using one of L0 prediction, L1 prediction or Bi-prediction.

When applying inter prediction to the current block, the neighboring block of the current block may include a spatial neighboring block present in the current picture and a temporal neighboring block present in the reference picture. A reference picture including the reference block for the current block and a reference picture including the temporal neighboring block may be the same or different. The temporal neighboring block may be referred to as a collocated reference block or collocated CU (colCU), and the reference picture including the temporal neighboring block may be referred to as a collocated picture (colPic).

Meanwhile, a motion information candidate list may be constructed based on the neighboring blocks of the current block, and, in this case, flag or index information indicating which candidate is used may be signaled in order to derive the motion vector of the current block and/or the reference picture index.

The motion information may include L0 motion information and/or L1 motion information according to the inter prediction type. The motion vector in an L0 direction may be defined as an L0 motion vector or MVL0, and the motion vector in an L1 direction may be defined as an L1 motion vector or MVL1. Prediction based on the L0 motion vector may be defined as L0 prediction, prediction based on the L1 motion vector may be defined as L1 prediction, and prediction based both the L0 motion vector and the L1 motion vector may be defined as Bi-prediction. Here, the L0 motion vector may mean a motion vector associated with a reference picture list L0 and the L1 motion vector may mean a motion vector associated with a reference picture list L1.

The reference picture list L0 may include pictures before the current picture in output order as reference pictures, and the reference picture list L1 may include pictures after the current picture in output order. The previous pictures may be defined as forward (reference) pictures and the subsequent pictures may be defined as backward (reference) pictures. Meanwhile, the reference picture list L0 may further include pictures after the current picture in output order as reference pictures. In this case, within the reference picture list L0, the previous pictures may be first indexed and the subsequent pictures may then be indexed. The reference picture list L1 may further include pictures before the current picture in output order as reference pictures. In this case, within the reference picture list L1, the subsequent pictures may be first indexed and the previous pictures may then be indexed. Here, the output order may correspond to picture order count (POC) order.

Figure 4:
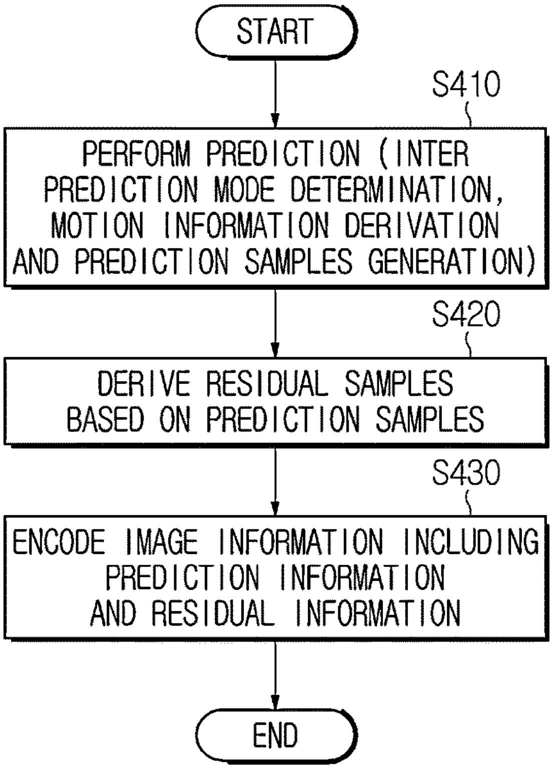
FIG. 4 is a flowchart illustrating an inter prediction based video/image encoding method.

FIG. 4 is a flowchart illustrating an inter prediction based video/image encoding method.

Figure 5:
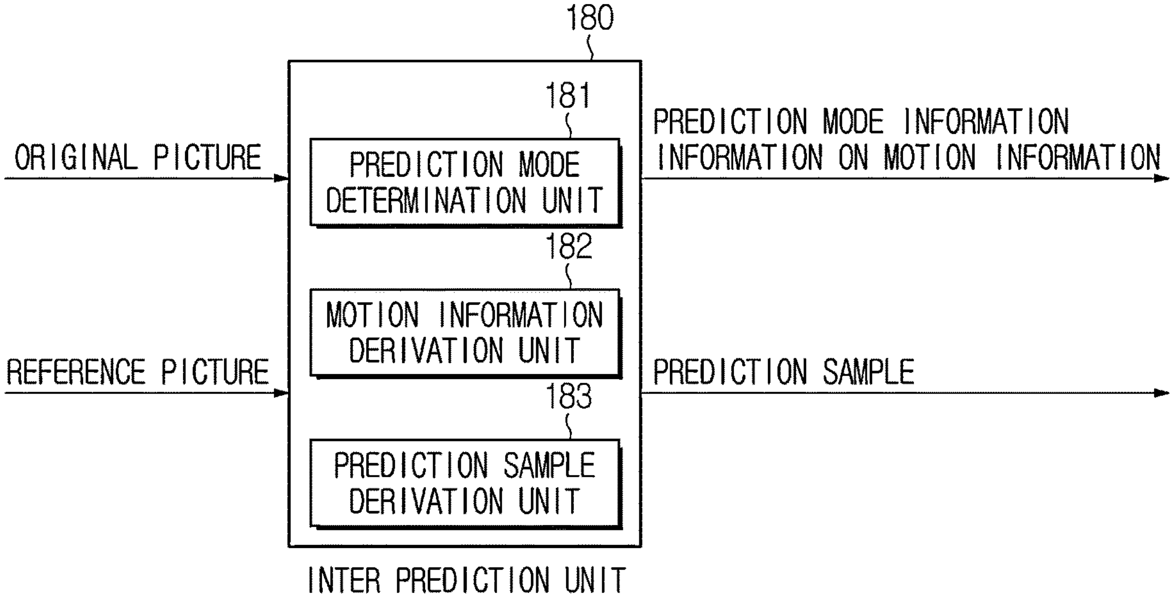
FIG. 5 is a view illustrating the configuration of an inter prediction unit 180 according to the present disclosure.

FIG. 5 is a view illustrating the configuration of an inter predictor 180 according to the present disclosure.

Figure 6:
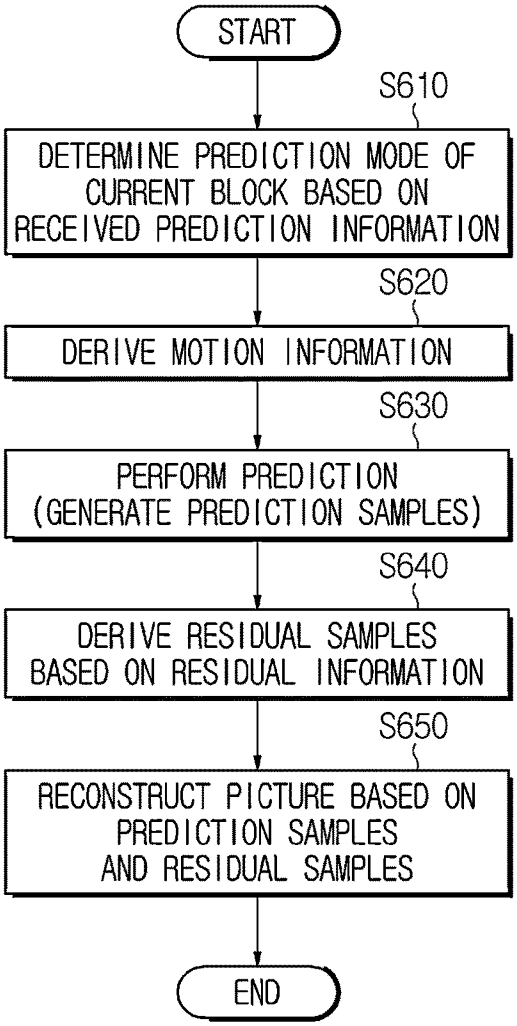
FIG. 6 is a flowchart illustrating an inter prediction based video/image decoding method.

The encoding method of FIG. 6 may be performed by the image encoding apparatus of FIG. 2. Specifically, step S410 may be performed by the inter predictor 180, and step S420 may be performed by the residual processor. Specifically, step S420 may be performed by the subtractor 115. Step S430 may be performed by the entropy encoder 190. The prediction information of step S630 may be derived by the inter predictor 180, and the residual information of step S630 may be derived by the residual processor. The residual information is information on the residual samples. The residual information may include information on quantized transform coefficients for the residual samples. As described above, the residual samples may be derived as transform coefficients through the transformer 120 of the image encoding apparatus, and the transform coefficient may be derived as quantized transform coefficients through the quantizer 130. Information on the quantized transform coefficients may be encoded by the entropy encoder 190 through a residual coding procedure.

The image encoding apparatus may perform inter prediction with respect to a current block (S410). The image encoding apparatus may derive an inter prediction mode and motion information of the current block and generate prediction samples of the current block. Here, inter prediction mode determination, motion information derivation and prediction samples generation procedures may be simultaneously performed or any one thereof may be performed before the other procedures. For example, as shown in FIG. 5, the inter prediction unit 180 of the image encoding apparatus may include a prediction mode determination unit 181, a motion information derivation unit 182 and a prediction sample derivation unit 183. The prediction mode determination unit 181 may determine the prediction mode of the current block, the motion information derivation unit 182 may derive the motion information of the current block, and the prediction sample derivation unit 183 may derive the prediction samples of the current block. For example, the inter prediction unit 180 of the image encoding apparatus may search for a block similar to the current block within a predetermined area (search area) of reference pictures through motion estimation, and derive a reference block whose difference from the current block is equal to or less than a predetermined criterion or a minimum. Based on this, a reference picture index indicating a reference picture in which the reference block is located may be derived, and a motion vector may be derived based on a position difference between the reference block and the current block. The image encoding apparatus may determine a mode applying to the current block among various inter prediction modes. The image encoding apparatus may compare rate-distortion (RD) costs for the various prediction modes and determine an optimal inter prediction mode of the current block. However, the method of determining the inter prediction mode of the current block by the image encoding apparatus is not limited to the above example, and various methods may be used.

For example, the inter prediction mode of the current block may be determined to be at least one of a merge mode, a merge skip mode, a motion vector prediction (MVP) mode, a symmetric motion vector difference (SMVD) mode, an affine mode, a subblock-based merge mode, an adaptive motion vector resolution (AMVR) mode, a history-based motion vector predictor (HMVP) mode, a pair-wise average merge mode, a merge mode with motion vector differences (MMVD) mode, a decoder side motion vector refinement (DMVR) mode, a combined inter and intra prediction (CIIP) mode or a geometric partitioning mode (GPM).

For example, when a skip mode or a merge mode applies to the current block, the image encoding apparatus may derive merge candidates from neighboring blocks of the current block and construct a merge candidate list using the derived merge candidates. In addition, the image encoding apparatus may derive a reference block whose difference from the current block is equal to or less than a predetermined criterion or a minimum, among reference blocks indicated by merge candidates included in the merge candidate list. In this case, a merge candidate associated with the derived reference block may be selected, and merge index information indicating the selected merge candidate may be generated and signaled to an image decoding apparatus. The motion information of the current block may be derived using the motion information of the selected merge candidate.

As another example, when an MVP mode applies to the current block, the image encoding apparatus may derive motion vector predictor (MVP) candidates from the neighboring blocks of the current block and construct an MVP candidate list using the derived MVP candidates. In addition, the image encoding apparatus may use the motion vector of the MVP candidate selected from among the MVP candidates included in the MVP candidate list as the MVP of the current block. In this case, for example, the motion vector indicating the reference block derived by the above-described motion estimation may be used as the motion vector of the current block, an MVP candidate with a motion vector having a smallest difference from the motion vector of the current block among the MVP candidates may be the selected MVP candidate. A motion vector difference (MVD) which is a difference obtained by subtracting the MVP from the motion vector of the current block may be derived. In this case, index information indicating the selected MVP candidate and information on the MVD may be signaled to the image decoding apparatus. In addition, when applying the MVP mode, the value of the reference picture index may be constructed as reference picture index information and separately signaled to the image decoding apparatus.

The image encoding apparatus may derive residual samples based on the prediction samples (S420). The image encoding apparatus may derive the residual samples through comparison between original samples of the current block and the prediction samples. For example, the residual sample may be derived by subtracting a corresponding prediction sample from an original sample.

The image encoding apparatus may encode image information including prediction information and residual information (S430). The image encoding apparatus may output the encoded image information in the form of a bitstream. The prediction information may include prediction mode information (e.g., skip flag, merge flag or mode index, etc.) and information on motion information as information related to the prediction procedure. Among the prediction mode information, the skip flag indicates whether a skip mode applies to the current block, and the merge flag indicates whether the merge mode applies to the current block. Alternatively, the prediction mode information may indicate one of a plurality of prediction modes, such as a mode index. When the skip flag and the merge flag are 0, it may be determined that the MVP mode applies to the current block. The information on the motion information may include candidate selection information (e.g., merge index, mvp flag or mvp index) which is information for deriving a motion vector. Among the candidate selection information, the merge index may be signaled when the merge mode applies to the current block and may be information for selecting one of merge candidates included in a merge candidate list. Among the candidate selection information, the MVP flag or the MVP index may be signaled when the MVP mode applies to the current block and may be information for selecting one of MVP candidates in an MVP candidate list. Specifically, the MVP flag may be signaled using a syntax element mvp_10_flag or mvp_11_flag. In addition, the information on the motion information may include information on the above-described MVD and/or reference picture index information. In addition, the information on the motion information may include information indicating whether to apply L0 prediction, L1 prediction or Bi-prediction. The residual information is information on the residual samples. The residual information may include information on quantized transform coefficients for the residual samples.

The output bitstream may be stored in a (digital) storage medium and transmitted to the image decoding apparatus or may be transmitted to the image decoding apparatus via a network.

As described above, the image encoding apparatus may generate a reconstructed picture (a picture including reconstructed samples and a reconstructed block) based on the reference samples and the residual samples. This is for the image encoding apparatus to derive the same prediction result as that performed by the image decoding apparatus, thereby increasing coding efficiency. Accordingly, the image encoding apparatus may store the reconstructed picture (or the reconstructed samples and the reconstructed block) in a memory and use the same as a reference picture for inter prediction. As described above, an in-loop filtering procedure is further applicable to the reconstructed picture.

FIG. 6 is a flowchart illustrating an inter prediction based video/image decoding method.

Figure 7:
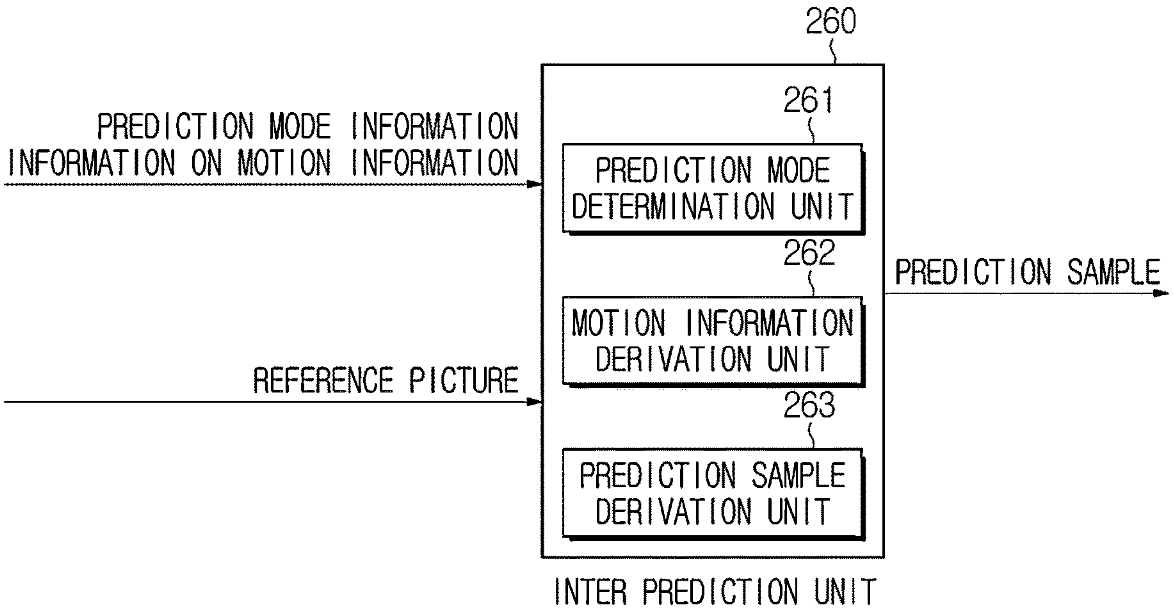
FIG. 7 is a view illustrating the configuration of an inter prediction unit 260 according to the present disclosure.

FIG. 7 is a view illustrating the configuration of an inter prediction unit 260 according to the present disclosure.

The image decoding apparatus may perform operation corresponding to operation performed by the image encoding apparatus. The image decoding apparatus may perform prediction with respect to a current block based on received prediction information and derive prediction samples.

The decoding method of FIG. 6 may be performed by the image decoding apparatus of FIG. 3. Steps S610 to S630 may be performed by the inter prediction unit 260, and the prediction information of step S610 and the residual information of step S640 may be obtained from a bitstream by the entropy decoder 210. The residual processor of the image decoding apparatus may derive residual samples for a current block based on the residual information (S640). Specifically, the dequantizer 220 of the residual processor may perform dequantization based on quantized transform coefficients derived based on the residual information to derive transform coefficients, and the inverse transformer 230 of the residual processor may perform inverse transform with respect to the transform coefficients to derive the residual samples for the current block. Step S650 may be performed by the adder 235 or the reconstructor.

Specifically, the image decoding apparatus may determine the prediction mode of the current block based on the received prediction information (S610). The image decoding apparatus may determine which inter prediction mode applies to the current block based on the prediction mode information in the prediction information.

For example, it may be determined whether the skip mode applies to the current block based on the skip flag. In addition, it may be determined whether the merge mode or the MVP mode applies to the current block based on the merge flag. Alternatively, one of various inter prediction mode candidates may be selected based on the mode index. The inter prediction mode candidates may include a skip mode, a merge mode and/or an MVP mode or may include various inter prediction modes which will be described below.

The image decoding apparatus may derive the motion information of the current block based on the determined inter prediction mode (S620). For example, when the skip mode or the merge mode applies to the current block, the image decoding apparatus may construct a merge candidate list, which will be described below, and select one of merge candidates included in the merge candidate list. The selection may be performed based on the above-described candidate selection information (merge index). The motion information of the current block may be derived using the motion information of the selected merge candidate. For example, the motion information of the selected merge candidate may be used as the motion information of the current block.

As another example, when the MVP mode applies to the current block, the image decoding apparatus may construct an MVP candidate list and use the motion vector of an MVP candidate selected from among MVP candidates included in the MVP candidate list as an MVP of the current block. The selection may be performed based on the above-described candidate selection information (mvp flag or mvp index). In this case, the MVD of the current block may be derived based on information on the MVD, and the motion vector of the current block may be derived based on MVP and MVD of the current block. In addition, the reference picture index of the current block may be derived based on the reference picture index information. A picture indicated by the reference picture index in the reference picture list of the current block may be derived as a reference picture referenced for inter prediction of the current block.

The image decoding apparatus may generate prediction samples of the current block based on motion information of the current block (S630). In this case, the reference picture may be derived based on the reference picture index of the current block, and the prediction samples of the current block may be derived using the samples of the reference block indicated by the motion vector of the current block on the reference picture. In some cases, a prediction sample filtering procedure may be further performed with respect to all or some of the prediction samples of the current block.

For example, as shown in FIG. 7, the inter prediction unit 260 of the image decoding apparatus may include a prediction mode determination unit 261, a motion information derivation unit 262 and a prediction sample derivation unit 263. In the inter prediction unit 260 of the image decoding apparatus, the prediction mode determination unit 261 may determine the prediction mode of the current block based on the received prediction mode information, the motion information derivation unit 262 may derive the motion information (a motion vector and/or a reference picture index, etc.) of the current block based on the received motion information, and the prediction sample derivation unit 263 may derive the prediction samples of the current block.

The image decoding apparatus may generate residual samples of the current block based the received residual information (S640). The image decoding apparatus may generate the reconstructed samples of the current block based on the prediction samples and the residual samples and generate a reconstructed picture based on this (S650). Thereafter, an in-loop filtering procedure is applicable to the reconstructed picture as described above.

As described above, the inter prediction procedure may include step of determining an inter prediction mode, step of deriving motion information according to the determined prediction mode, and step of performing prediction (generating prediction samples) based on the derived motion information. The inter prediction procedure may be performed by the image encoding apparatus and the image decoding apparatus, as described above.

Hereinafter, the step of deriving the motion information according to the prediction mode will be described in greater detail.

As described above, inter prediction may be performed using motion information of a current block. An image encoding apparatus may derive optimal motion information of a current block through a motion estimation procedure. For example, the image encoding apparatus may search for a similar reference block with high correlation within a predetermined search range in the reference picture using an original block in an original picture for the current block in fractional pixel unit, and derive motion information using the same. Similarity of the block may be calculated based on a sum of absolute differences (SAD) between the current block and the reference block. In this case, motion information may be derived based on a reference block with a smallest SAD in the search area. The derived motion information may be signaled to an image decoding apparatus according to various methods based on an inter prediction mode.

When a merge mode applies to a current block, motion information of the current block is not directly transmitted and motion information of the current block is derived using motion information of a neighboring block. Accordingly, motion information of a current prediction block may be indicated by transmitting flag information indicating that the merge mode is used and candidate selection information (e.g., a merge index) indicating which neighboring block is used as a merge candidate. In the present disclosure, since the current block is a unit of prediction performance, the current block may be used as the same meaning as the current prediction block, and the neighboring block may be used as the same meaning as a neighboring prediction block.

The image encoding apparatus may search for merge candidate blocks used to derive the motion information of the current block to perform the merge mode. For example, up to five merge candidate blocks may be used, without being limited thereto. The maximum number of merge candidate blocks may be transmitted in a slice header or a tile group header, without being limited thereto. After finding the merge candidate blocks, the image encoding apparatus may generate a merge candidate list and select a merge candidate block with smallest RD cost as a final merge candidate block.

The present disclosure provides various embodiments for the merge candidate blocks configuring the merge candidate list. The merge candidate list may use, for example, five merge candidate blocks. For example, four spatial merge candidates and one temporal merge candidate may be used.

Figure 8:
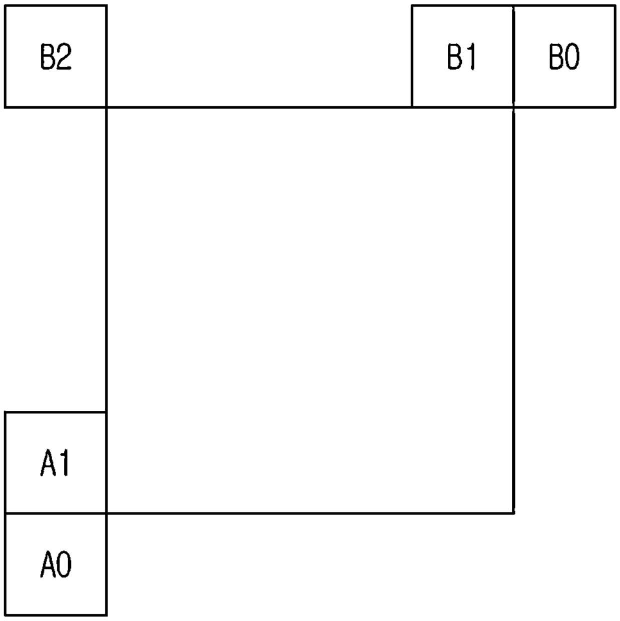
FIG. 8 is a view illustrating neighboring blocks available as a spatial merge candidate.

FIG. 8 is a view illustrating neighboring blocks available as a spatial merge candidate.

Figure 9:
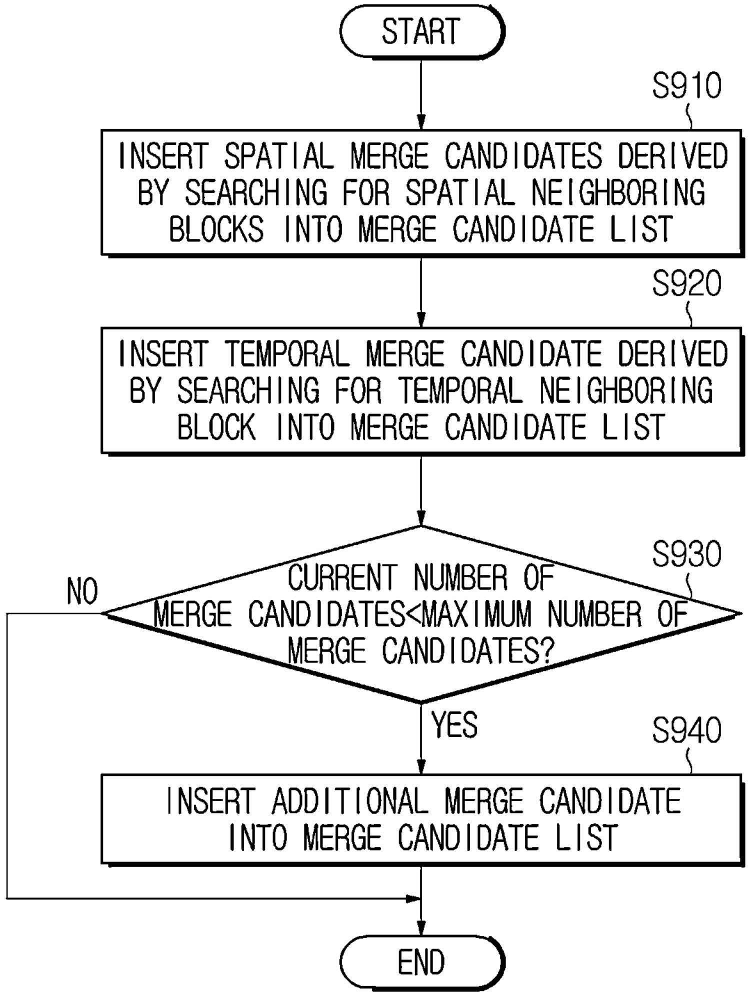
FIG. 9 is a view schematically illustrating a merge candidate list construction method according to an example of the present disclosure.

FIG. 9 is a view schematically illustrating a merge candidate list construction method according to an example of the present disclosure.

An image encoding/decoding apparatus may insert, into a merge candidate list, spatial merge candidates derived by searching for spatial neighboring blocks of a current block (S910). For example, as shown in FIG. 8, the spatial neighboring blocks may include a bottom-left corner neighboring block $A_0$, a left neighboring block $A_1$, a top-right corner neighboring block $B_0$, a top neighboring block $B_1$, and a top-left corner neighboring block $B_2$ of the current block. However, this is an example and, in addition to the above-described spatial neighboring blocks, additional neighboring blocks such as a right neighboring block, a bottom neighboring block and a bottom-right neighboring block may be further used as the spatial neighboring blocks. The image encoding/decoding apparatus may detect available blocks by searching for the spatial neighboring blocks based on priority and derive motion information of the detected blocks as the spatial merge candidates. For example, the image encoding/decoding apparatus may construct a merge candidate list by searching for the five blocks shown in FIG. 8 in order of $A_1$, $B_1$, $B_0$, $A_0$ and $B_2$ and sequentially indexing available candidates.

The image encoding/decoding apparatus may insert, into the merge candidate list, a temporal merge candidate derived by searching for temporal neighboring blocks of the current block (S920). The temporal neighboring blocks may be located on a reference picture which is different from a current picture in which the current block is located. A reference picture in which the temporal neighboring block is located may be referred to as a collocated picture or a col picture. The temporal neighboring block may be searched for in order of a bottom-right corner neighboring block and a bottom-right center block of the co-located block for the current block on the col picture. Meanwhile, when applying motion data compression in order to reduce memory load, specific motion information may be stored as representative motion information for each predetermined storage unit for the col picture. In this case, motion information of all blocks in the predetermined storage unit does not need to be stored, thereby obtaining motion data compression effect. In this case, the predetermined storage unit may be predetermined as, for example, 16×16 sample unit or 8×8 sample unit or size information of the predetermined storage unit may be signaled from the image encoding apparatus to the image decoding apparatus. When applying the motion data compression, the motion information of the temporal neighboring block may be replaced with the representative motion information of the predetermined storage unit in which the temporal neighboring block is located. That is, in this case, from the viewpoint of implementation, the temporal merge candidate may be derived based on the motion information of a prediction block covering an arithmetic left-shifted position after an arithmetic right shift by a predetermined value based on coordinates (top-left sample position) of the temporal neighboring block, not a prediction block located on the coordinates of the temporal neighboring block. For example, when the predetermined storage unit is a $2^n \times 2^n$ sample unit and the coordinates of the temporal neighboring block are (xTnb, yTnb), the motion information of a prediction block located at a modified position ((xTnb>>n)<<n), (yTnb>>n)<<n)) may be used for the temporal merge candidate. Specifically, for example, when the predetermined storage unit is a 16×16 sample unit and the coordinates of the temporal neighboring block are (xTnb, yTnb), the motion information of a prediction block located at a modified position ((xTnb>>4)<<4), (yTnb>>4)<<4)) may be used for the temporal merge candidate. Alternatively, for example, when the predetermined storage unit is an 8×8 sample unit and the coordinates of the temporal neighboring block are (xTnb, yTnb), the motion information of a prediction block located at a modified position ((xTnb>>3)<<3), (yTnb>>3)<<3)) may be used for the temporal merge candidate.

Referring to FIG. 9 again, the image encoding/decoding apparatus may check whether the current number of merge candidates is less than a maximum number of merge candidates (S930). The maximum number of merge candidates may be predefined or signaled from the image encoding apparatus to the image decoding apparatus. For example, the image encoding apparatus may generate and encode information on the maximum number of merge candidates and transmit the encoded information to the image decoding apparatus in the form of a bitstream. When the maximum number of merge candidates is satisfied, a subsequent candidate addition process S940 may not be performed.

When the current number of merge candidates is less than the maximum number of merge candidates as a checked result of step S930, the image encoding/decoding apparatus may derive an additional merge candidate according to a predetermined method and then insert the additional merge candidate to the merge candidate list (S940). The additional merge candidate may include, for example, at least one of history based merge candidate(s), pair-wise average merge candidate(s), ATMVP, combined bi-predictive merge candidate(s) (when a slice/tile group type of a current slice/tile group is a B type) and/or zero vector merge candidate(s).

When the current number of merge candidates is not less than the maximum number of merge candidates as a checked result of step S930, the image encoding/decoding apparatus may end the construction of the merge candidate list. In this case, the image encoding apparatus may select an optimal merge candidate from among the merge candidates configuring the merge candidate list, and signal candidate selection information (e.g., merge candidate index or merge index) indicating the selected merge candidate to the image decoding apparatus. The image decoding apparatus may select the optimal merge candidate based on the merge candidate list and the candidate selection information.

The motion information of the selected merge candidate may be used as the motion information of the current block, and the prediction samples of the current block may be derived based on the motion information of the current block, as described above. The image encoding apparatus may derive the residual samples of the current block based on the prediction samples and signal residual information of the residual samples to the image decoding apparatus. The image decoding apparatus may generate reconstructed samples based on the residual samples derived based on the residual information and the prediction samples and generate the reconstructed picture based on the same, as described above.

When applying a skip mode to the current block, the motion information of the current block may be derived using the same method as the case of applying the merge mode. However, when applying the skip mode, a residual signal for a corresponding block is omitted and thus the prediction samples may be directly used as the reconstructed samples. The above skip mode may apply, for example, when the value of cu_skip_flag is 1.

Hereinafter, a method of deriving a spatial candidate in a merge mode and/or a skip mode will be described. The spatial candidate may represent the above-described spatial merge candidate.

Derivation of the spatial candidate may be performed based on spatially neighboring blocks. For example, a maximum of four spatial candidates may be derived from candidate blocks existing at positions shown in FIG. 8. The order of deriving spatial candidates may be A1→B1→B0→A0→B2. However, the order of deriving spatial candidates is not limited to the above order and may be, for example, B1→A1→B0→A0→B2. The last position in the order (position B2 in the above example) may be considered when at least one of the preceding four positions (A1, B1, B0 and A0 in the above example) is not available. In this case, a block at a predetermined position being not available may include a corresponding block belonging to a slice or tile different from the current block or a corresponding block being an intra-predicted block. When a spatial candidate is derived from a first position in the order (A1 or B1 in the above example), redundancy check may be performed on spatial candidates of subsequent positions. For example, when motion information of a subsequent spatial candidate is the same as motion information of a spatial candidate already included in a merge candidate list, the subsequent spatial candidate may not be included in the merge candidate list, thereby improving encoding efficiency. Redundancy check performed on the subsequent spatial candidate may be performed on some candidate pairs instead of all possible candidate pairs, thereby reducing computational complexity.

Figure 10:
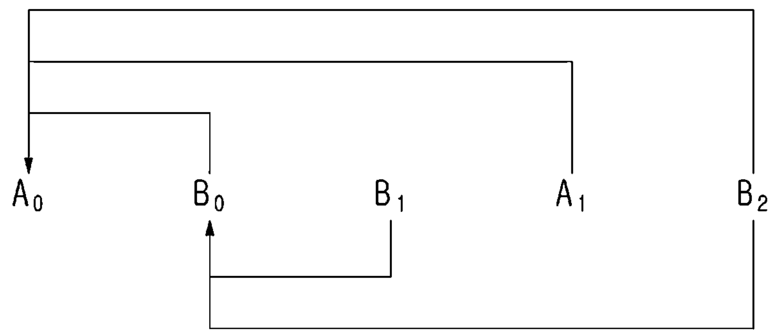
FIG. 10 is a view illustrating a candidate pair for redundancy check performed on a spatial candidate.

FIG. 10 is a view illustrating a candidate pair for redundancy check performed on a spatial candidate.

In the example shown in FIG. 10, redundancy check for a spatial candidate at a position $B_0$ may be performed only for a spatial candidate at a position $A_0$. In addition, redundancy check for a spatial candidate at a position $B_1$ may be performed only for a spatial candidate at a position $B_0$. In addition, redundancy check for a spatial candidate at a position $A_1$ may be performed only for a spatial candidate at a position $A_0$. Finally, redundancy check for a spatial candidate at a position $B_2$ may be performed only for spatial candidates at a position $A_0$ and a position $B_0$.

In the example shown in FIG. 10, the order of deriving the spatial candidates is A0→B0→B1→A1→B2. However, the present disclosure is not limited thereto and, even if the order of deriving the spatial candidates is changed, as in the example shown in FIG. 10, redundancy check may be performed only on some candidate pairs.

Hereinafter, a method of deriving a temporal candidate in the case of a merge mode and/or a skip mode will be described. The temporal candidate may represent the above-described temporal merge candidate. In addition, the motion vector of the temporal candidate may correspond to the temporal candidate of an MVP mode.

In the case of the temporal candidate, only one candidate may be included in a merge candidate list. In the process of deriving the temporal candidate, the motion vector of the temporal candidate may be scaled. For example, the scaling may be performed based on a collocated block (CU) (hereinafter referred to as a "col block") belonging to a collocated reference picture (colPic) (hereinafter referred to as "col picture"). A reference picture list used to derive the col block may be explicitly signaled in a slice header.

Figure 11:
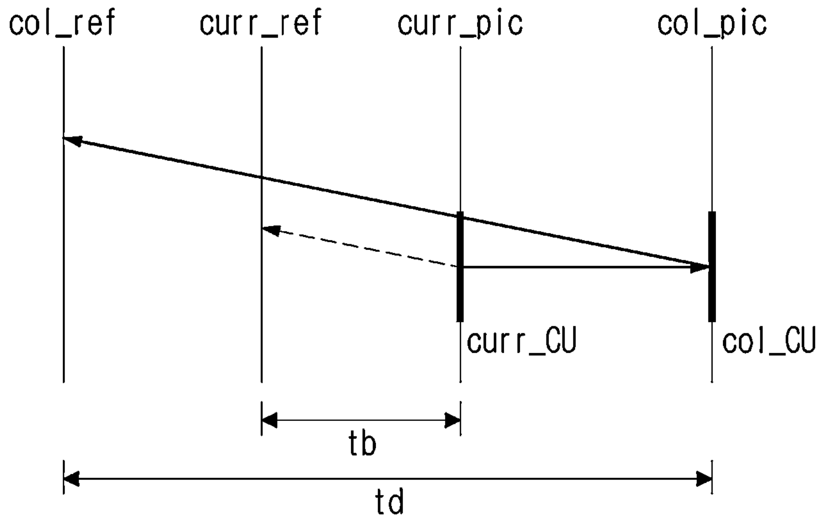
FIG. 11 is a view illustrating a method of scaling a motion vector of a temporal candidate.

FIG. 11 is a view illustrating a method of scaling a motion vector of a temporal candidate.

In FIG. 11, curr_CU and curr_pic respectively denote a current block and a current picture, and col_CU and col_pic respectively denote a col block and a col picture. In addition, curr_ref denote a reference picture of a current block, and col_ref denotes a reference picture of a col block. In addition, tb denotes a distance between the reference picture of the current block and the current picture, and td denotes a distance between the reference picture of the col block and the col picture. tb and td may denote values corresponding to differences in POC (Picture Order Count) between pictures. Scaling of the motion vector of the temporal candidate may be performed based on tb and td. In addition, the reference picture index of the temporal candidate may be set to 0.

Figure 12:
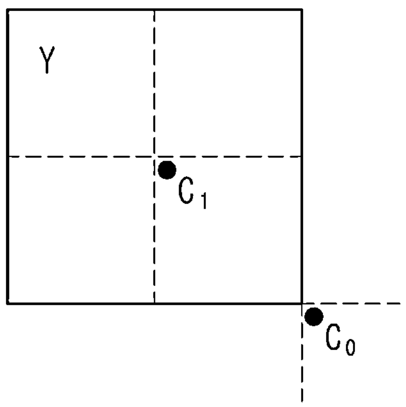
FIG. 12 is a view illustrating a position where a temporal candidate is derived.

FIG. 12 is a view illustrating a position where a temporal candidate is derived.

In FIG. 12, a block with a thick solid line denotes a current block. A temporal candidate may be derived from a block in a col picture corresponding to a position $C_0$ (bottom-right position) or $C_1$ (center position) of FIG. 12. First, it may be determined whether the position $C_0$ is available and, when the position $C_0$ is available, the temporal candidate may be derived based on the position $C_0$. When the position $C_0$ is not available, the temporal candidate may be derived based on the position $C_1$. For example, when a block in the col picture at the position $C_0$ is an intra-predicted block or is located outside a current CTU row, it may be determined that the position $C_0$ is not available.

As described above, when applying motion data compression, the motion vector of the col block may be stored for each predetermined unit block. In this case, in order to derive the motion vector of a block covering the position $C_0$ or the position $C_1$, the position $C_0$ or the position $C_1$ may be modified. For example, when the predetermined unit block is an 8×8 block and the position $C_0$ or the position $C_1$ is (xColCi, yColCi), a position for deriving the temporal candidate may be modified to ((xColCi>>3)<<3, (yColCi>>3)<<3).

Hereinafter, a method of deriving a history-based candidate in the case of a merge mode and/or a skip mode will be described. The history-based candidate may be expressed by a history-based merge candidate.

The history-based candidate may be added to a merge candidate list after a spatial candidate and a temporal candidate are added to the merge candidate list. For example, motion information of a previously encoded/decoded block may be stored at a table and used as a history-based candidate of a current block. The table may store a plurality of history-based candidates during the encoding/decoding process. The table may be initialized when a new CTU row starts. Initializing the table may mean that the corresponding table is emptied by deleting all the history-based candidates stored in the table. Whenever there is an inter-predicted block, related motion information may be added to the table as a last entry. In this case, the inter-predicted block may not be a block predicted based on a subblock. The motion information added to the table may be used as a new history-based candidate.

The table of the history-based candidates may have a predetermined size. For example, the size may be 5. In this case, the table may store a maximum of five history-based candidates. When a new candidate is added to the table, a limited first-in-first-out (FIFO) rule in which redundancy check of checking whether the same candidate is present in the table may apply. If the same candidate is already present in the table, the same candidate may be deleted from the table and positions of all subsequent history-based candidates may be moved forward.

The history-based candidate may be used in a process of configuring the merge candidate list. In this case, the history-based candidates recently included in the table may be sequentially checked and located at a position after the temporal candidate of the merge candidate list. When the history-based candidate is included in the merge candidate list, redundancy check with the spatial candidates or temporal candidates already included in the merge candidate list may be performed. If the spatial candidate or temporal candidate already included in the merge candidate list and the history-based candidate overlap, the history-based candidate may not be included in the merge candidate list. By simplifying the redundancy check as follows, the amount of computation may be reduced.

The number of history-based candidates used to generate the merge candidate list may be set to (N<=4)?M: (8−N). In this case, N may denote the number of candidates already included in the merge candidate list, and M may denote the number of available history-based candidate included in the table. That is, when 4 or less candidates are included in the merge candidate list, the number of history-based candidates used to generate the merge candidate list may be M, and, when N candidates greater than 4 are included in the merge candidate list, the number of history-based candidates used to generate the merge candidate list may be set to (8−N).

When the total number of available merge candidates reaches (maximum allowable number of merge candidates−1), configuration of the merge candidate list using the history-based candidate may end.

Hereinafter, a method of deriving a pair-wise average candidate in the case of a merge mode and/or a skip mode will be described. The pair-wise average candidate may be represented by a pair-wise average merge candidate or a pair-wise candidate.

The pair-wise average candidate may be generated by obtaining predefined candidate pairs from the candidates included in the merge candidate list and averaging them. The predefined candidate pairs may be {(0, 1), (0, 2), (1, 2), (0, 3), (1, 3), (2, 3)} and the number configuring each candidate pair may be an index of the merge candidate list. That is, the predefined candidate pair (0, 1) may mean a pair of index 0 candidate and index 1 candidate of the merge candidate list, and the pair-wise average candidate may be generated by an average of index 0 candidate and index 1 candidate. Derivation of pair-wise average candidates may be performed in the order of the predefined candidate pairs. That is, after deriving a pair-wise average candidate for the candidate pair (0, 1), the process of deriving the pair-wise average candidate may be performed in order of the candidate pair (0, 2) and the candidate pair (1, 2). The pair-wise average candidate derivation process may be performed until configuration of the merge candidate list is completed. For example, the pair-wise average candidate derivation process may be performed until the number of merge candidates included in the merge candidate list reaches a maximum merge candidate number.

The pair-wise average candidate may be calculated separately for each reference picture list. When two motion vectors are available for one reference picture list (L0 list or L1 list), an average of the two motion vectors may be computed. In this case, even if the two motion vectors indicate different reference pictures, an average of the two motion vectors may be performed. If only one motion vector is available for one reference picture list, an available motion vector may be used as a motion vector of a pair-wise average candidate. If both the two motion vectors are not available for one reference picture list, it may be determined that the reference picture list is not valid.

When configuration of the merge candidate list is not completed even after the pair-wise average candidate is included in the merge candidate list, a zero vector may be added to the merge candidate list until the maximum merge candidate number is reached.

When applying an MVP mode to the current block, a motion vector predictor (mvp) candidate list may be generated using a motion vector of a reconstructed spatial neighboring block (e.g., the neighboring block shown in FIG. 8) and/or a motion vector corresponding to the temporal neighboring block (or Col block). That is, the motion vector of the reconstructed spatial neighboring blocks and the motion vector corresponding to the temporal neighboring blocks may be used as motion vector predictor candidates of the current block. When applying bi-prediction, an mvp candidate list for L0 motion information derivation and an mvp candidate list for L1 motion information derivation are individually generated and used. Prediction information (or information on prediction) of the current block may include candidate selection information (e.g., an MVP flag or an MVP index) indicating an optimal motion vector predictor candidate selected from among the motion vector predictor candidates included in the mvp candidate list. In this case, a prediction unit may select a motion vector predictor of a current block from among the motion vector predictor candidates included in the mvp candidate list using the candidate selection information. The prediction unit of the image encoding apparatus may obtain and encode a motion vector difference (MVD) between the motion vector of the current block and the motion vector predictor and output the encoded MVD in the form of a bitstream. That is, the MVD may be obtained by subtracting the motion vector predictor from the motion vector of the current block. The prediction unit of the image decoding apparatus may obtain a motion vector difference included in the information on prediction and derive the motion vector of the current block through addition of the motion vector difference and the motion vector predictor. The prediction unit of the image decoding apparatus may obtain or derive a reference picture index indicating a reference picture from the information on prediction.

Figure 13:
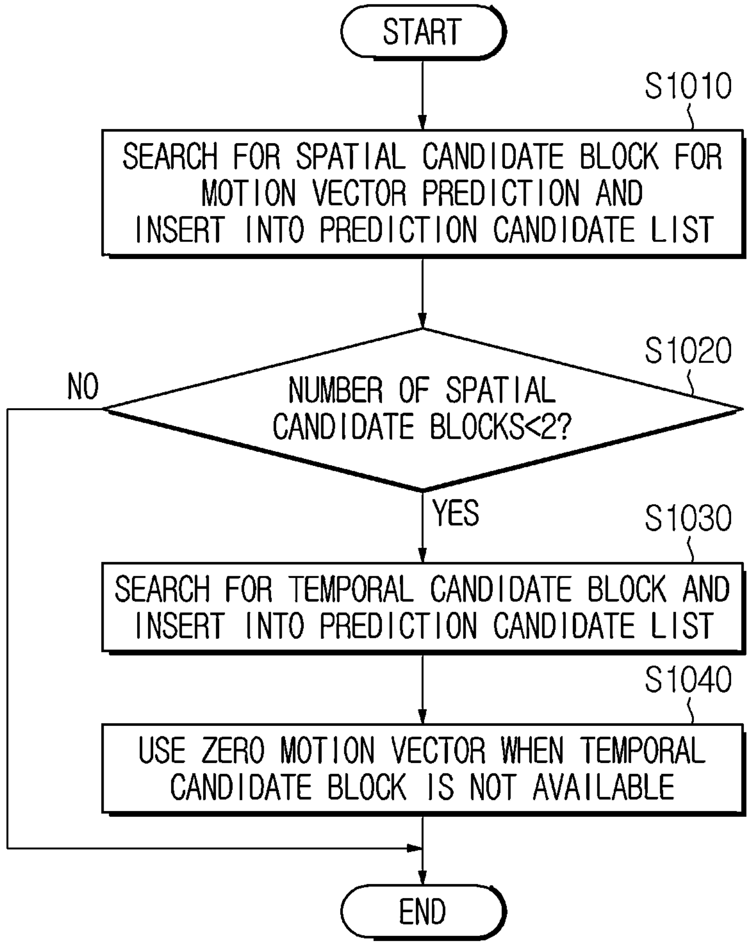
FIG. 13 is a view schematically illustrating a motion vector predictor candidate list configuration method according to an example of the present disclosure.

FIG. 13 is a view schematically illustrating a motion vector predictor candidate list construction method according to an example of the present disclosure.

First, a spatial candidate block of a current block may be searched for and available candidate blocks may be inserted into an MVP candidate list (S1010). Thereafter, it is determined whether the number of MVP candidates included in the MVP candidate list is less than 2 (S1020) and, when the number of MVP candidates is two, construction of the MVP candidate list may be completed.

In step S1020, when the number of available spatial candidate blocks is less than 2, a temporal candidate block of the current block may be searched for and available candidate blocks may be inserted into the MVP candidate list (S1030). When the temporal candidate blocks are not available, the above-described history-based candidate and/or a zero motion vector may be inserted into the MVP candidate list (S1040), thereby completing construction of the MVP candidate list.

Meanwhile, when applying an mvp mode, a reference picture index may be explicitly signaled. In this case, a reference picture index refidxL0 for L0 prediction and a reference picture index refidxL1 for L1 prediction may be distinguishably signaled. For example, when applying the MVP mode and applying Bi-prediction, both information on refidxL0 and information on refidxL1 may be signaled.

As described above, when applying the MVP mode, information on MVP derived by the image encoding apparatus may be signaled to the image decoding apparatus. Information on the MVD may include, for example, an MVD absolute value and information indicating x and y components for a sign. In this case, when the MVD absolute value is greater than 0, whether the MVD absolute value is greater than 1 and information indicating an MVD remainder may be signaled stepwise. For example, information indicating whether the MVD absolute value is greater than 1 may be signaled only when a value of flag information indicating whether the MVD absolute value is greater than 0 is 1.

Triangle Partition for Inter Prediction (TPM)

As an inter prediction mode, a triangle partition for inter prediction (TPM; triangle partition mode) may be used. The TPM may apply to a CU having a size of 8×8 or more. Information specifying whether the TPM is used for a current CU may be, for example, signaled as flag information at a CU level. The TPM may be treated as one mode included in a general merge mode along with a regular merge mode, an MMVD mode, a CIIP mode and a subblock merge mode.

Figure 14:
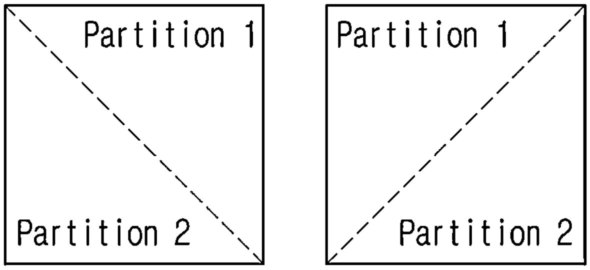
FIG. 14 is a view illustrating an example in which a current block is partitioned into two triangle partitions by applying a TPM.

FIG. 14 is a view illustrating an example in which a current block is partitioned into two triangle partitions by applying a TPM.

As shown in FIG. 14, when applying the TPM, the current block (CU) may be diagonally or inverse-diagonally partitioned into two triangle partitions. Each triangle partition is inter-predicted using each motion and only uni-prediction is allowed for each partition. That is, each triangle partition may have one motion vector and one reference picture index. The reason why only uni-prediction is allowed for each partition is because two motion-compensated prediction blocks are required for each CU as in normal bi-prediction.

FIG. 15 is a view illustrating a method of deriving unidirectional motion for each partition of a TPM.

Motion information for uni-prediction of the TPM may be derived from the merge candidate list described with reference to FIG. 9. For example, for uni-prediction of the TPM, a uni-prediction candidate list may be derived from the merge candidate list of FIG. 9. When a variable n is an index of a uni-prediction motion candidate included in a uni-prediction candidate list of triangle partition, an LX motion vector (X being equal to a parity of n) of an n-th merge candidate may be used as an n-th uni-prediction motion vector of the TPM. The n-th uni-prediction motion vector of the TPM is denoted by "x" in FIG. 15. In this case, when an LX motion vector of the n-th merge candidate is not present, instead of the LX motion vector, an L(1−X) motion vector of the n-th merge mode may be used as the uni-prediction motion vector of the TPM. For example, in FIG. 15, the L1 motion vector of a first candidate (candidate having a merge index of 1) may be used as a first uni-prediction motion information, and, when the L1 motion vector of the first candidate is not present, an L0 motion vector of the first candidate may be used as the first uni-prediction motion vector.

When the TPM is used for the current block, a flag specifying a triangle partition direction (diagonal direction or inverse diagonal direction) and two merge indices (one for each partition) may be signaled. A maximum number of TPM merge candidates may be explicitly signaled at a slice level. In addition, a syntax binarization method for a TPM merge index may be specified according to the maximum number of TPM merge candidates. After prediction is performed on each partition, prediction sample values may be adjusted along a diagonal or inverse diagonal line. Adjustment of the prediction sample values may be performed by a blending process using an adaptive weight. A prediction signal generated by the TPM is for an entire CU (current block), and a transform and quantization process for a residual signal may be performed on the entire CU as in other prediction modes. Finally, a motion field of a CU predicted in the TPM may be stored in units of 4×4 samples. The TPM is not performed along with subblock transform (SBT). That is, when the flag specifying the TPM has a first value (e.g., 1), a flag (e.g., cu_sbt_flag) specifying whether to perform transform in subblock units may be inferred as a second value without being signaled.

After prediction is performed on each triangle partition, the blending process may be performed. The blending process may apply to two prediction signals, thereby deriving samples around a diagonal edge or inverse diagonal edge.

FIG. 16 is a view illustrating a blending process of a TPM.

To perform the blending process, for example, the following weight sets may be used.

weight set for luma signal={7/8, 6/8, 5/8, 4/8, 3/8, 2/8, 1/8} weight set for chroma signal={6/8, 4/8, 2/8}

FIG. 16 shows an example of a process of blending two prediction blocks P1 and P2 generated using motion information of each triangle partition by applying a TPM to an 8×8 block. In FIG. 16, a top-right $P_1$ region may be derived by a prediction sample value of a prediction block $P_1$, and a bottom-left $P_2$ region may be derived by a prediction sample value of a prediction block $P_2$. In addition, a gray region may be derived by a weighted sum of the prediction sample value of the prediction block $P_1$ and the prediction sample value of the prediction block $P_2$. In this case, a weight applying to each of the prediction sample value of the prediction block $P_1$ and the prediction sample value of the prediction block $P_2$ may be derived based on the number denoted at each sample position of FIG. 16. For example, when the number denoted at the sample position is "4", the weight applying to each of the prediction sample value of the prediction block $P_1$ and the prediction sample value of the prediction block $P_2$ to derive the sample value at the corresponding sample position may be "4/8" and "4/8". In addition, when the number denoted at the sample position is "3", the weight applying to each of the prediction sample value of the prediction block $P_1$ and the prediction sample value of the prediction block $P_2$ to derive the sample value at the corresponding sample position may be "3/8" and "5/8".

As described above, by generating the prediction blocks $P_1$ and $P_2$ for each triangle partition and performing the blending process, a final prediction block for the current block CU may be generated.

As described above, motion vectors of the current block coded in the TPM may be stored in units of 4×4 samples. In this case, based on the position of each 4×4 sample unit, a uni-prediction motion vector or bi-prediction motion vectors may be stored.

When unidirectional motion vectors for two triangle partitions (first partition and second partition) obtained by partitioning the current block are respectively mv1 and mv2, mv1 or mv2 may be stored for a 4×4 sample unit located in a region where a weighted sum is not performed. For example, in FIG. 16, when the 4×4 sample unit is located in the top-right $P_1$ region, the motion vector mv1 for the first partition may be stored. In addition, when the 4×4 sample unit is located in the bottom-left $P_2$ region, the motion vector mv2 for the second partition may be stored.

Otherwise, when the 4×4 sample unit is located in a region where a weighted sum is performed, bi-prediction motion vectors may be stored. The bi-prediction motion vectors may be derived based on mv1 and mv2. More specifically, when mv1 and mv2 belong to different reference picture lists, for example, when one motion vector is a motion vector of an L0 list and the other motion vector is a motion vector of an L1 list, mv1 and mv2 are simply combined to form a bi-prediction motion vector.

Otherwise, when mv1 and mv2 belong to the same reference picture list, for example, when both the two motion vectors are motion vectors of an L0 list, the motion vectors may be stored as follows with respect to the corresponding 4×4 sample unit.

When a reference picture of mv2 (or mv1) is included in an L1 list, mv2 (or mv1) may be switched to a motion vector of the L1 list using the reference picture included in the L1 list. Thereafter, the motion vector of the L0 list and the switched motion vector of the L1 list may be combined to form a bi-prediction motion vector.

Otherwise, instead of the bi-prediction motion vector, a uni-prediction motion vector mv1 may be stored.

Combined Inter and Intra Prediction (CIIP)

By applying CIIP to a current block, a prediction block of the current block may be generated. Information (e.g., ciip_flag) specifying whether CIIP applies to the current block may be signaled through a bitstream. For example, when the current block is coded in a merge mode, the current block includes at least 64 luma samples (that is, the product of the width and height of the current block is 64 or more) and both the width and height of the current block are less than 128, information specifying whether CIIP applies to the current block may be signaled.

CIIP is a method of generating a prediction block by combining an inter-predicted signal and an intra-predicted signal. The inter-predicted signal Pinter may be derived using the same process as the inter prediction process applying to a regular merge mode. The intra-predicted signal $P_{intra}$ may be derived according to a regular intra prediction process for a planar mode. Thereafter, by performing a weighted sum of the inter-predicted signal and the intra-predicted signal, a final prediction signal of the current block to which CIIP applies may be generated. The weight used for the weighted sum may be calculated based on encoding modes of neighboring blocks.

FIG. 17 is a view illustrating positions of neighboring blocks used to calculate a weight of CIIP.

As shown in FIG. 17, the neighboring blocks may include a top neighboring block and a left neighboring block of a current block. In this case, the top neighboring block may be adjacent to a top-right position of the current block. In addition, the left neighboring block may be adjacent to a bottom-left position of the current block.

When the top neighboring block is available and intra-predicted, information isIntraTop specifying whether the top neighboring block is intra-predicted may be set to 1 and, otherwise, isIntraTop may be set to 0.

When the left neighboring block is available and intra-predicted, information isintraLeft specifying whether the left neighboring block is intra-predicted may be set to 1 and, otherwise, isintraLeft may be set to 0.

When (isIntraTop+isintraLeft) is 2, that is, when both isIntraTop and isintraLeft are 1, a weight wt may be set to 3.

Otherwise, when (isIntraTop+isintraLeft) is 1, that is, when only one of isIntraTop and isintraLeft is 1, a weight wt may be set to 2.

Otherwise, that is, when both isIntraTop and isintraLeft are 0, a weight wt may be set to 1.

Using the inter-predicted signal Pinter, the intra-predicted signal $P_{intra}$ and the weight wt, the prediction block of the current block to which CIIP applies may be generated as follows.

$$P_{CIIP} = ((4 - wt) * P_{inter} + wt * P_{intra} + 2) >> 2 \quad \text{[Equation 1]}$$

As described above, a merge candidate list and/or an MVP candidate list may additionally include a history-based candidate (HMVP candidate). That is, in a candidate list construction process, in addition to a spatial candidate and a temporal candidate, motion information of a previous block, which has been encoded/decoded, may be stored in a buffer having a predetermined size, and may be used as an HMVP candidate. Therefore, motion information of a block not adjacent to the current block may be used as a merge candidate and/or an MVP candidate.

As described with reference to FIG. 9, when a maximum number of candidates included in the merge candidate list is 6, a spatial candidate and a temporal candidate may be inserted into the merge candidate list. When the number of candidates included in the merge candidate list is less than 6, additional candidates may be inserted into the merge candidate list in order of an HMVP candidate, a pairwise candidate and a zero vector candidate.

In addition, after prediction according to a merge mode and/or an AMVP mode is finished, the buffer may be updated by inserting the motion information of the current block into an HMVP buffer (LUT), and the HMVP candidate including the updated candidate may then be used as a merge candidate and/or an AMVP candidate.

Figure 18:
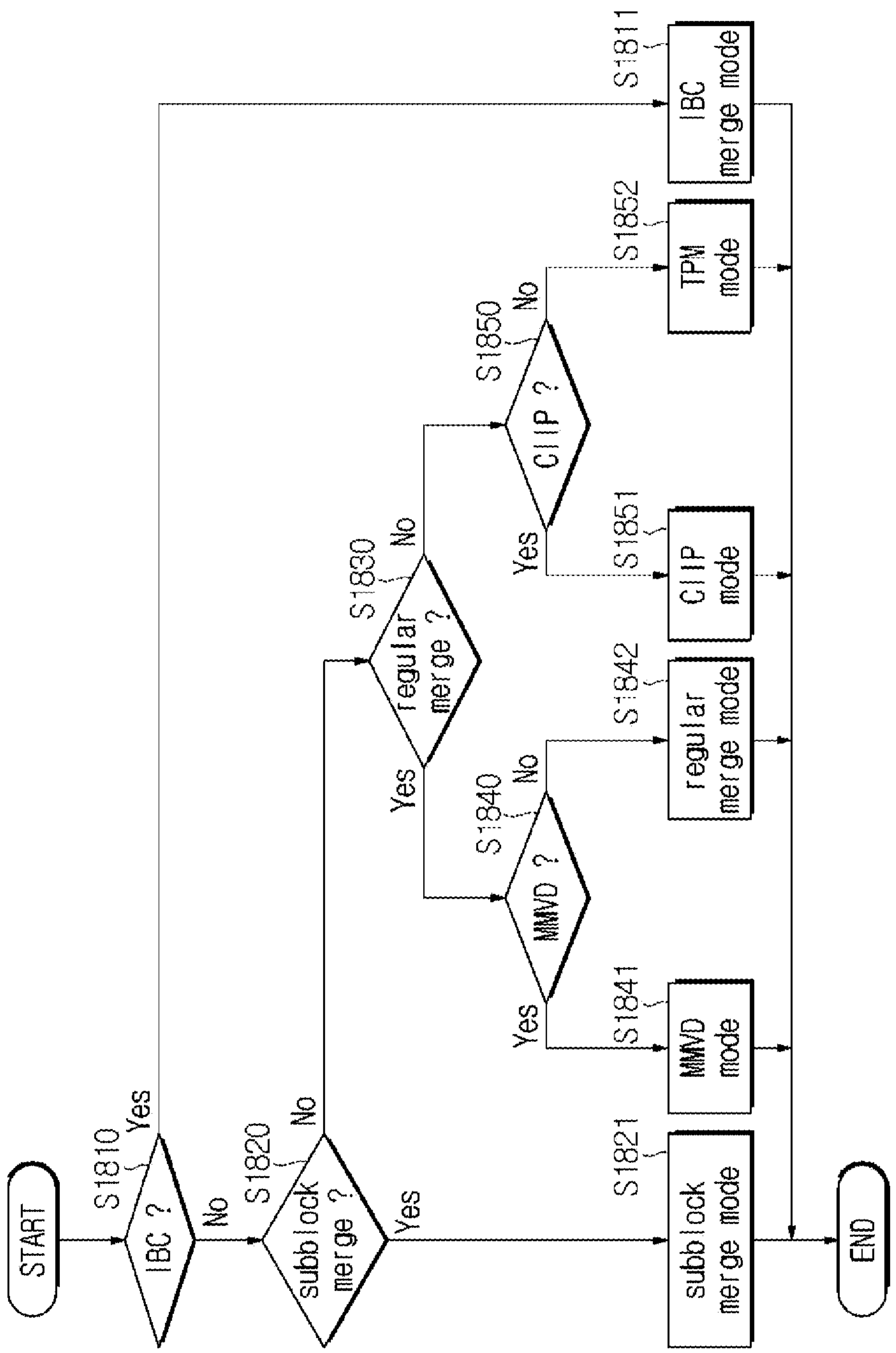
FIG. 18 is a view illustrating a process of selecting one of various merge modes included in a general merge mode.

FIG. 18 is a view illustrating a process of selecting one of various merge modes included in a general merge mode.

As shown in FIG. 18, when a current block is predicted in a general merge mode, a prediction mode of the current block may be determined to be one of a subblock merge mode, an MMVD mode, a regular merge mode, a CIIP mode, a TPM mode and an IBC merge mode.

A selection process of the merge mode shown in FIG. 18 may be performed when the current block is predicted in the general merge mode. Whether the current block is predicted in the general merge mode may be determined based on information (e.g., general_merge_flag) signaled through a bitstream.

When the general merge mode is performed on the current block, in step S1810, whether the prediction mode of the current block is an IBC mode may be determined. When the prediction mode of the current block is an IBC mode (S1810—Yes), the prediction mode of the current block may be determined to be an IBC merge mode (S1811). In this case, information (e.g., merge_idx) specifying the IBC merge mode may be signaled.

When the prediction mode of the current block is not an IBC mode (S1810—No), whether the prediction mode of the current block is a subblock merge mode may be determined (S1820). Determination of step S1820 may be made based on information (e.g., merge_subblock_flag) signaled through the bitstream. Upon determining that the prediction mode of the current block is a subblock merge mode (S1820—Yes), the prediction mode of the current block may be determined to be a subblock merge mode (S1821), and information (e.g., merge_subblock_idx) specifying the subblock merge candidate may be signaled.

When the prediction mode of the current block is not a subblock merge mode (S1820—No), whether the prediction mode of the current block is a regular merge mode may be determined (S1830). Determination of step S1830 may be made based on information (e.g., regular_merge_flag) signaled through the bitstream.

When the prediction mode of the current block is a regular merge mode (S1830—Yes), whether the prediction mode of the current block is an MMVD mode may be determined (S1840). Determination of step S1840 may be made based on information (e.g., mmvd_merge_flag) signaled through the bitstream. Upon determining that the prediction mode of the current block is an MMVD mode (S1840—Yes), the prediction mode of the current block may be determined to be an MMVD mode (S1841), and information (e.g., mmvd_cand_flag) specifying the MMVD merge candidate may be signaled. In addition, distance information and direction information necessary to perform the MMVD mode may be additionally signaled.

When the prediction mode of the current block is not an MMVD mode (S1840—No), the prediction mode of the current block may be determined to be a regular merge mode (S1842). In this case, information (e.g., merge_idx) specifying the regular merge candidate may be signaled.

When the prediction mode of the current block is not a regular merge mode (S1830—No), whether the prediction mode of the current block is a CIIP mode may be determined (S1850). Determination of step S1850 may be made based on information (e.g., ciip_flag) signaled through the bitstream. When the prediction mode of the current block is a CIIP mode (S1850—Yes), the prediction mode of the current block may be determined to be a CIIP mode (S1851). In this case, information (e.g., merge_idx) specifying a merge candidate for generating the inter-predicted signal of the CIIP mode may be signaled.

When the prediction mode of the current block is not a CIIP mode (S1850—No), the prediction mode of the current block may be determined to be a TPM mode (S1852). In this case, information (e.g., partition_idx) specifying the partition form (partition direction) of the TPM mode may be signaled. In addition, information (e.g., merge_idx0 and merge_idx1) specifying a merge candidate for each of two partitions may be signaled.

In the present disclosure, the TPM mode in which the current block is partitioned into two triangle partitions may be replaced with a GPM mode in which the current block is partitioned into partitions having any shape. For example, in the GPM mode, the current block may be partitioned by a predetermined straight line, thereby generating two partitions. The predetermined straight line partitioning the current block may be predetermined by the image encoding apparatus and the image decoding apparatus. For example, for the GPM mode, a lookup table for the partition shape of the current block may be prestored and an index for the lookup table may be transmitted from the image encoding apparatus to the image decoding apparatus, thereby signaling the GPM mode partition shape of the current block. In this case, partition_idx may be an index specifying the partition shape of the GPM mode. In addition, merge_idx0 and merge_idx1 may be merge index information of each partition generated by partitioning of the GPM mode.

When the prediction mode of the current block is a subblock merge mode, the motion vector of the current block is derived in units of subblocks. Accordingly, the HMVP candidate is not used as a subblock merge candidate. In addition, the motion vector of the current block is not updated in the HMVP buffer. Meanwhile, when the prediction mode of the current block is a TPM mode, the HMVP candidate is used as a merge candidate for each partition but the motion vector of the current block is not updated in the HMVP buffer. In addition, when the prediction mode of the current block is a regular merge mode, an MMVD mode or a CIIP mode, the HMVP candidate is used as the merge candidate of the current block and the motion vector of the current block is updated in the HMVP buffer.

However, in the TPM mode, as in the subblock merge mode, even though the motion vector is derived in units of 4×4 blocks, the HMVP candidate is used as a merge mode and, in the CIIP mode, even though the inter-predicted signal and the intra-prediction signal are subjected to a weighted sum, the motion vector of the current block is updated in the HMVP buffer for a next block.

Embodiments according to the present disclosure described below may provide an improved method of performing update of the HMVP candidate. The embodiments according to the present disclosure relate to update of the HMVP buffer in the merge mode and update of the HMVP buffer in the IBC mode is not considered.

According to an embodiment of the present disclosure, when the prediction mode of the current block is a TPM mode, the HMVP buffer may be updated.

Figure 19:
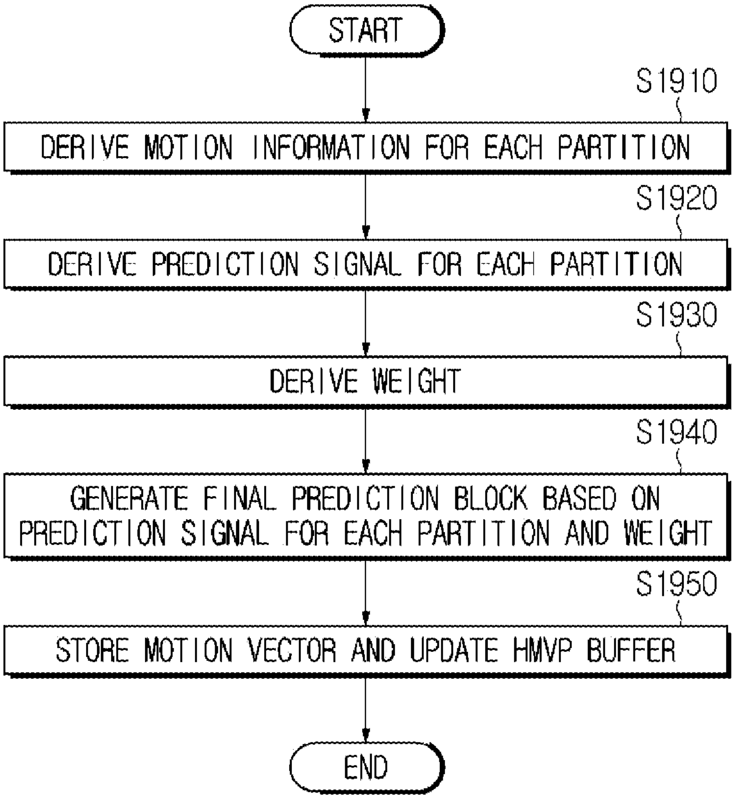
FIG. 19 is a view illustrating a prediction method of a TPM mode according to the present disclosure.

FIG. 19 is a view illustrating a prediction method of a TPM mode according to the present disclosure.

When the prediction mode of the current block is a TPM mode, motion information of each of two partitions obtained by partitioning the current block may be derived (S1910). As described above, the motion information of the TPM mode may be derived from the merge candidate list generated by the method of FIG. 9. In this case, as described above, the merge candidate list may additionally include the HMVP candidate. The motion information of each of the two partitions may be derived by specifying a candidate included in the merge candidate list using merge indices merge_idx0 and merge_idx1 signaled through the bitstream.

As described above, using the motion information of each derived partition, a prediction signal for each partition may be derived (S1920). For example, by performing inter prediction based on a reference picture and a motion vector specified by the motion information, prediction signals (prediction block $P_1$ and prediction block $P_2$) for each partition may be generated.

In step S1930, a weight which will apply to the prediction signal for each partition may be derived. As described above, the weight may be derived based on the partition shape (partition direction) of the TPM and the positions of the samples in the current block.

Thereafter, by performing the blending process based on the prediction signals (prediction block $P_1$ and prediction block $P_2$) derived in step S1920 and the weight derived in step S1930, a final prediction block for the current block may be generated (S1940).

Thereafter, in step S1950, the motion vector storage process based on the motion vectors of the current block and HMVP buffer update may be performed. In this case, the HMVP buffer update may be performed based on the motion information derived in the motion vector storage process. More specifically, the HMVP buffer update may be performed using motion information (representative motion information) at a predetermined position of the current block derived in the motion vector storage process. The predetermined position may be a center position of the current block. For example, when the width and height of the current block are respectively cbWidth and cbHeight, the predetermined position may be a position of a (cbWidth>>1, cbHeight>>1) coordinate. That is, input of the HMVP buffer update in the TPM mode may include motion vectors mvL0 and mvL1, reference picture indices refIdxL0 and refIdxL1 and prediction direction flags predflagL0 and predflagL1 of a (cbWidth>>1, cbHeight>>1) coordinate. In addition, input of the HMVP buffer update may include a weight index bcwIdx of bcw set to 0.

In the present disclosure, bcw may mean a method of performing bi-prediction using the weight derived at a CU level. For example, when bi-prediction applies to the current block, prediction samples may be derived based on a weighted average. Conventionally, a bi-prediction signal (that is, bi-prediction samples) may be derived through a simple average of an L0 prediction signal (L0 prediction samples) and an L1 prediction signal (L1 prediction samples). That is, the bi-prediction samples was derived by an average of the L0 prediction samples based on MVL0 and an L0 reference picture and L1 prediction samples based on MVL1 and an L1 reference picture. However, when applying bcw, the bi-prediction signal (bi-prediction samples) may be derived through a weighted average of the L0 prediction signal and the L1 prediction signal. In this case, a weight bcwIdx necessary to perform the weighted average may be derived at the CU level. For example, the weight w may be selected from {−2, 3, 4, 5, 10}, and bcwIdx may be used as an index specifying one weight from among them. bcwIdx set to 0 may specify that the same weight applies to L0 prediction samples and L1 prediction samples. That is, bcwIdx set to 0 may specify that bi-prediction samples are generated by a simple average of the L0 prediction samples and the L1 prediction samples.

According to the present embodiment, when the prediction mode of the current block is a TPM mode, the HMVP buffer may be updated using the motion vector of the current block. Accordingly, in the TPM mode, a problem that the HMVP buffer is not updated using the derived motion information of the current block while the HMVP candidate is used as the merge candidate to derive the motion information of the current block may be solved.

The present embodiment may be performed by a method of changing a condition for updating the HMVP buffer. For example, the process of performing the HMVP buffer update in case the prediction mode of the current block is not a subblock merge mode (affine mode) or a TPM mode may be changed to the process of performing the HMVP buffer update in case the prediction mode of the current block is not a subblock merge mode (affine mode). That is, an existing condition may be changed to perform the HMVP buffer update in case the prediction mode of the current block is a TPM mode. Alternatively, regardless of whether the prediction mode of the current block is a subblock merge mode (affine mode) or a TPM mode, an existing condition may be changed to always perform the HMVP buffer update.

In the embodiment described with reference to FIG. 19, input of the HMVP buffer update includes motion information at a predetermined position derived in the motion vector storage process. According to another embodiment of the present disclosure, the HMVP buffer update in the TPM mode may be performed regardless of the above-described motion vector storage process.

In the example of FIG. 14, when the motion vector of Partition 1 is mvA and the motion vector of Partition 2 is mvB, mvA and/or mvB may be used as input of the HMVP buffer update. For example, regardless of the partition direction (partition type), the HMVP buffer update may be performed using the motion information (first motion information) of Partition 1 or the motion information (second motion information) of Partition 2. Specifically, input of the HMVP buffer update may include a motion vector mvB, a reference picture index refIdxB, a prediction direction flag predflagB of Partition 2 and bcwIdx set to 0. Alternatively, input of the HMVP buffer update may include a motion vector mvA, a reference picture index refIdxA, a prediction direction flag predflagA of Partition 1 and bcwIdx set to 0.

Alternatively, input of the HMVP buffer update may vary according to the partition direction (partition type). Specifically, as shown on the left side of FIG. 14, in case of diagonal partition, input of the HMVP buffer update may include a motion vector mvA, a reference picture index refIdxA, a prediction direction flag predflagA of Partition 1 and bcwIdx set to 0. In contrast, as shown on the right side of FIG. 14, in case of inverse diagonal partition, input of the HMVP buffer update may include a motion vector mvB, a reference picture index refIdxB, a prediction direction flag predflagB of Partition 2 and bcwIdx set to 0. However, the present disclosure is not limited to the above example, and the HMVP buffer update may be performed using motion information of Partition 2 in case of diagonal partition and the HMVP buffer update may be performed using motion information of Partition 1 in case of inverse diagonal partition.

Figure 20:
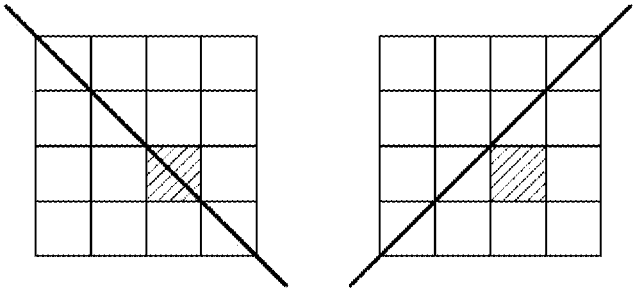
FIG. 20 is a view illustrating an example of deriving representative motion information of a TPM mode according to the present disclosure.

FIG. 20 is a view illustrating an example of deriving representative motion information of a TPM mode according to the present disclosure.

As described above, the motion information of the current block predicted in the TPM mode may be stored in units of 4×4 samples, and FIG. 20 shows an example in which the current block is partitioned in units of 4×4 samples.

According to another embodiment of the present disclosure, the HMVP update may be performed using motion information at a predetermined position (e.g., center position) of the current block as representative motion information regardless of the partition direction (partition type) of the TPM mode. In this case, motion information of the hatched 4×4 sample unit of FIG. 20 may be used as representative motion information. As described above, a center position for deriving the representative motion information may be represented by (cbWidth>>1, cbHeight>>1).

Figure 21:
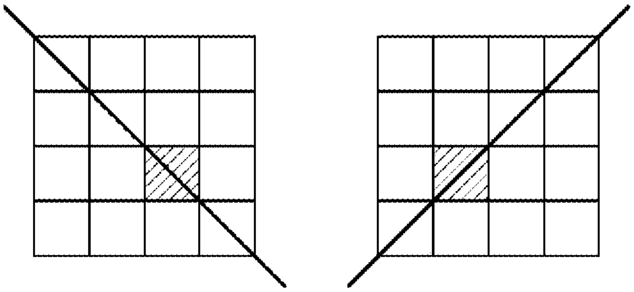
FIG. 21 is a view illustrating another example of deriving representative motion information of a TPM mode according to the present disclosure.

FIG. 21 is a view illustrating another example of deriving representative motion information of a TPM mode according to the present disclosure.

According to another embodiment of the present disclosure, the HMVP update may be performed using motion information at a position derived in consideration of the partition direction (partition type) of the TPM mode as representative motion information. As shown on the left side of FIG. 21, when the partition direction of the TPM is diagonal partition, a predetermined position for deriving the representative motion information may be derived as (cbWidth>>1, cbHeight>>1). That is, motion information of the 4×4 sample unit of the hatched portion shown on the left side of FIG. 21 may be used as the representative motion information. In addition, as shown on the right side of FIG. 21, when the partition direction of the TPM is inverse diagonal partition, the predetermined position for deriving the representative motion information may be derived as (cbWidth>>1−1, cbHeight>>1). That is, the motion information of the 4×4 sample unit of the hatched portion shown on the right side of FIG. 21 may be used as the representative motion information.

According to another embodiment of the present disclosure, the predetermined position for deriving the representative motion information may be derived as a predetermined position in the current block such as a right-bottom position in the current block or the left-top position in the current block, instead of the center position in the current block. In this case, the right-bottom position in the current block may be specified by (cbWidth−1, cbHeight−1) coordinates and the left-top position in the current block may be specified by (0, 0) coordinates.

As described above, in case of the TPM mode, as in the subblock merge mode, even though the motion vector is derived in units of 4×4 samples, the HMVP candidate is used as a merge candidate. According to another embodiment of the present disclosure, in case of the TPM mode, by not using the HMVP candidate as the merge candidate and not performing the HMVP buffer update, the above-described problem may be solved.

As described with reference to FIG. 9, after a spatial candidate and a temporal candidate are inserted into the merge candidate list, when the number of merge candidates is less than 6, additional candidates may be inserted into the merge candidate list in order of an HMVP candidate, a pairwise candidate and a zero vector candidate.

According to the present embodiment, when the prediction mode of the current block is a TPM mode, as the additional candidate, the HMVP candidate may not be used. That is, in case of the TPM mode, after a spatial candidate and a temporal candidate are inserted into the merge candidate list, when the number of candidates included in the merge candidate list is less than 6, additional candidates may be inserted into the merge candidate list in order of a pairwise candidate and a zero vector candidate.

According to the present embodiment, in case of the TPM mode, by not using the HMVP candidate as the merge candidate, the above-described problem may be solved.

The present embodiment may be performed by changing the condition for performing the step of inserting the HMVP candidate into the merge candidate list as the additional candidate in the process of generating the merge candidate list. That is, a modification may be made to perform step of determining whether the prediction mode of the current block is a TPM mode and inserting the HMVP candidate into the merge candidate list when it is not a TPM mode.

As described above, in case of the CIIP mode, even though a weighted sum of the inter-predicted signal and the intra-predicted signal is performed, the motion vector of the current block is updated in the HMVP buffer for a next block.

According to another embodiment of the present disclosure, in case of the CIIP mode, the above-described problem may be solved by not updating the motion vector of the current block in the HMVP buffer.

The present embodiment may be performed by a method of changing a condition for updating the HMVP buffer. For example, the process of performing the HMVP buffer update in case the prediction mode of the current block is not a subblock merge mode (affine mode) or a TPM mode may be changed to the process of performing the HMVP buffer update in case the prediction mode of the current block is not a subblock merge mode (affine mode), a TPM mode or a CIIP mode. That is, an existing condition may be changed so as not to perform the HMVP buffer update in case the prediction mode of the current block is a CIIP mode as well as the subblock merge mode (affine mode) and the TPM mode.

According to the embodiments of the present disclosure, in case of the TPM mode, inconsistency caused by not updating the motion information of the current block in the HMVP buffer while the HMVP candidate is used as the merge candidate of the current block may be solved. In addition, in case of the CIIP mode, by not updating the motion information of the current block in the HMVP buffer, the case where the motion information of the CIIP mode is used as the HMVP candidate for subsequent blocks may be prevented.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 22:
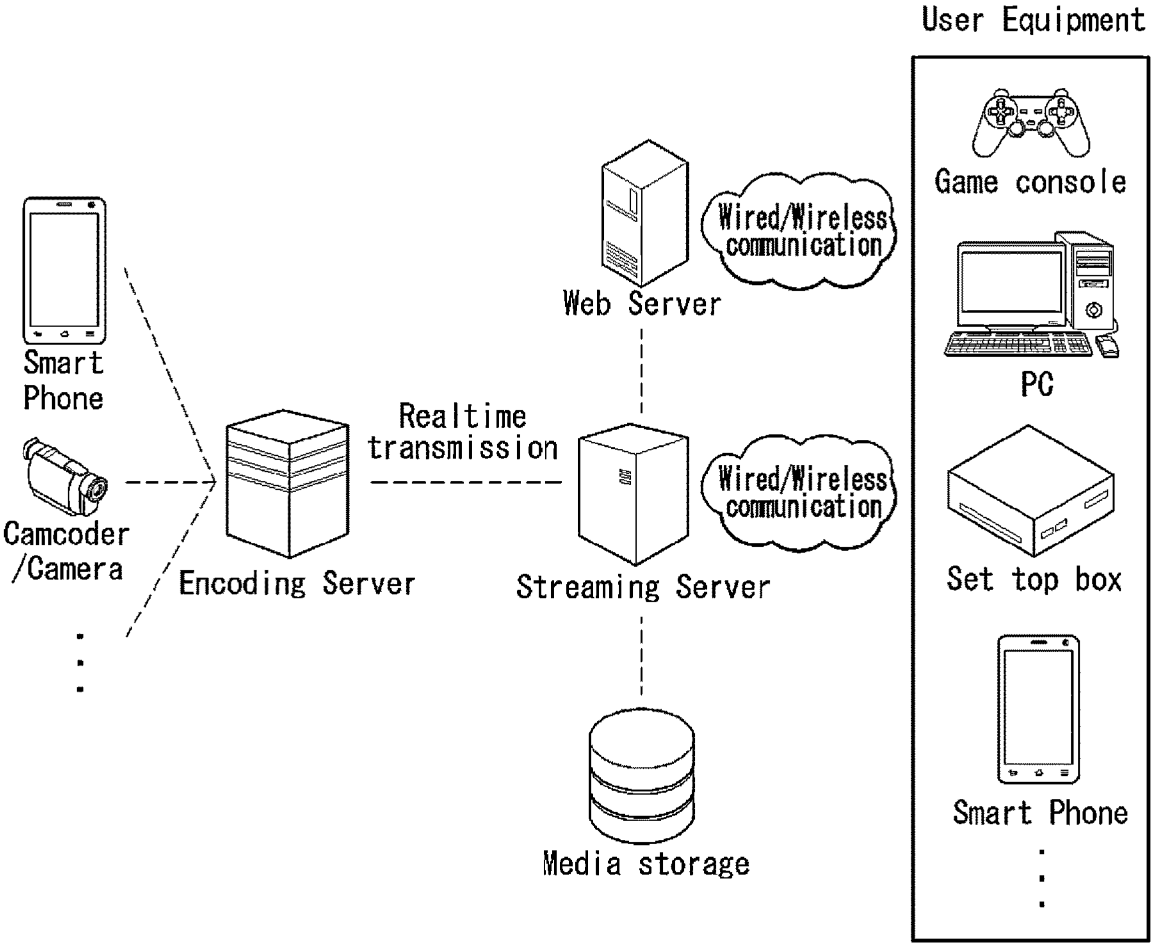
FIG. 22 is a view showing a content streaming system, to which an embodiment of the present disclosure is applicable.

FIG. 22 is a view showing a content streaming system, to which an embodiment of the present disclosure is applicable.

As shown in FIG. 22, the content streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding apparatus comprising:
- a memory; and
- at least one processor connected to the memory, the at least one processor configured to:
- derive a prediction mode of a current block;
- construct a merge candidate list for the current block, based on the prediction mode of the current block being a triangle partition mode (TPM);
- derive motion information of two partitions of the current block based on the merge candidate list and two merge indices of the current block signaled through a bitstream;
- generate a prediction block of the current block based on the motion information;
- store motion information of the current block; and
- update a history-based motion vector predictor (HMVP) buffer based on the motion information of the current block, wherein the HMVP buffer is updated based on motion information of a 4×4 sample unit at a predetermined position in the current block, and wherein, based on a width and height of the current block being respectively cbWidth and cbHeight, the predetermined position is derived as (cbWidth>>1, cbHeight>>1) based on the partition direction is diagonal partition and is derived as (cbWidth>>1−1, cbHeight>>1) based on the partition direction is inverse diagonal partition.

2. The image decoding apparatus of claim 1, wherein the merge candidate list comprises an HMVP candidate.

3. The image decoding apparatus of claim 1, wherein the motion information of the current block is stored based on the motion information in units of 4×4 samples in the current block.

4. The image decoding apparatus of claim 1, wherein the predetermined position is one of a center position, a top-left position or a bottom-right position in the current block.

5. The image decoding apparatus of claim 1, wherein the predetermined position is derived regardless of a partition direction of the triangle partition mode.

6. The image decoding apparatus of claim 1, wherein motion information of the two partitions comprises first motion information and second motion information, and wherein the HMVP buffer is updated based on one of the first motion information or the second motion information.

7. The image decoding apparatus of claim 6, comprising selecting one of the first motion information or the second motion information based on a partition direction of the triangle partition mode and updating the HMVP buffer based on the selected motion information.

8. The image decoding apparatus of claim 6, comprising updating the HMVP buffer based on one predefined motion information of the first motion information or the second motion information regardless of a partition direction of the triangle partition mode.

9. The image decoding apparatus of claim 1, wherein the motion information used to update the HMVP buffer comprises a motion vector, a reference picture index, a prediction direction flag and a weight index of bcw set to 0.

10. An image encoding apparatus comprising:

a memory; and at least one processor connected to the memory, the at least one processor configured to:

determine a prediction mode of a current block;

construct a merge candidate list for the current block, based on the prediction mode of the current block being a triangle partition mode (TPM);

determine a merge candidate for two partitions of the current block based on the merge candidate list;

derive motion information of the two partitions of the current block based on the determined merge candidate;

generate a prediction block of the current block based on the motion information;

store motion information of the current block;

update a history-based motion vector predictor (HMVP) buffer based on the motion information of the current block; and encode a merge index specifying the determined merge candidate in a bitstream, wherein the HMVP buffer is updated based on motion information of a 4×4 sample unit at a predetermined position in the current block, and wherein, based on a width and height of the current block being respectively cbWidth and cbHeight, the predetermined position is derived as (cbWidth>>1, cbHeight>>1) based on the partition direction is diagonal partition and is derived as (cbWidth>>1−1, cbHeight>>1) based on the partition direction is inverse diagonal partition.

11. An apparatus for transmitting a bitstream comprising:

at least one processor configured to obtain the bitstream; and a transmitter configured to transmit the bitstream, wherein the bitstream is generated by an image encoding method, the image encoding method comprising:

determining a prediction mode of a current block;

construct a merge candidate list for the current block, based on the prediction mode of the current block being a triangle partition mode (TPM);

determine a merge candidate for two partitions of the current block based on the merge candidate list;

derive motion information of the two partitions of the current block based on the determined merge candidate;

generate a prediction block of the current block based on the motion information;

store motion information of the current block;

update a history-based motion vector predictor (HMVP) buffer based on the motion information of the current block; and encode a merge index specifying the determined merge candidate in a bitstream, wherein the HMVP buffer is updated based on motion information of a 4×4 sample unit at a predetermined position in the current block, and wherein, based on a width and height of the current block being respectively cbWidth and cbHeight, the predetermined position is derived as (cbWidth>>1, cbHeight>>1) based on the partition direction is diagonal partition and is derived as (cbWidth>>1−1, cbHeight>>1) based on the partition direction is inverse diagonal partition.

* * * * *